United States Patent
Erol

(10) Patent No.: US 8,907,195 B1
(45) Date of Patent: Dec. 9, 2014

(54) METHOD AND APPARATUS FOR MUSICAL TRAINING

(71) Applicant: Neset Arda Erol, Surrey (CA)

(72) Inventor: Neset Arda Erol, Surrey (CA)

( * ) Notice: Subject to any disclaimer, the term of this patent is extended or adjusted under 35 U.S.C. 154(b) by 0 days.

(21) Appl. No.: 13/740,269

(22) Filed: Jan. 14, 2013

Related U.S. Application Data

(60) Provisional application No. 61/586,749, filed on Jan. 14, 2012.

(51) Int. Cl.
G09B 15/00 (2006.01)

(52) U.S. Cl.
USPC .............................................. 84/609; 84/649

(58) Field of Classification Search
USPC .................................................. 84/649, 609
See application file for complete search history.

(56) References Cited

U.S. PATENT DOCUMENTS

| | | | | |
|---|---|---|---|---|
| 4,429,609 | A * | 2/1984 | Warrender | 84/454 |
| 5,563,358 | A * | 10/1996 | Zimmerman | 84/477 R |
| 6,118,065 | A * | 9/2000 | Haruyama | 84/609 |
| 6,725,108 | B1 * | 4/2004 | Hall | 700/94 |
| 7,271,329 | B2 * | 9/2007 | Franzblau | 84/609 |
| 7,973,230 | B2 * | 7/2011 | Mahowald | 84/609 |
| 8,294,016 | B2 * | 10/2012 | Franzblau | 84/609 |
| 8,338,684 | B2 * | 12/2012 | Pillhofer et al. | 84/470 R |
| 2004/0098404 | A1 * | 5/2004 | Suzuki et al. | 707/102 |
| 2005/0204901 | A1 * | 9/2005 | Hasebe | 84/600 |
| 2005/0241462 | A1 * | 11/2005 | Hirano | 84/600 |
| 2005/0262989 | A1 * | 12/2005 | Franzblau | 84/470 R |
| 2008/0070203 | A1 * | 3/2008 | Franzblau | 434/157 |
| 2009/0165634 | A1 * | 7/2009 | Mahowald | 84/610 |
| 2009/0314154 | A1 * | 12/2009 | Esaki et al. | 84/611 |
| 2009/0317783 | A1 * | 12/2009 | Noguchi | 434/307 A |
| 2010/0233661 | A1 * | 9/2010 | Franzblau | 434/178 |
| 2010/0304863 | A1 * | 12/2010 | Applewhite et al. | 463/36 |
| 2013/0070093 | A1 * | 3/2013 | Rivera et al. | 348/143 |
| 2013/0112062 | A1 * | 5/2013 | Iriyama | 84/453 |
| 2013/0162649 | A1 * | 6/2013 | Oshima et al. | 345/440 |
| 2013/0171591 | A1 * | 7/2013 | Franzblau | 434/178 |
| 2013/0190555 | A1 * | 7/2013 | Tubman | 600/28 |
| 2014/0053217 | A1 * | 2/2014 | Rivera et al. | 725/80 |

* cited by examiner

Primary Examiner — David S. Warren

(57) ABSTRACT

A method and apparatus for providing musical training is disclosed. The method/apparatus allows a user to practice voice lessons, ear training lessons, songs, and/or various musical instruments that rely on good pitch perception (such as a violin or a brass instrument). The method/apparatus displays a sequence of music notes to the user via a combination of conventional music staffs (such as a grand staff) and instances of a pitch-based representation. The method/apparatus also displays the accuracy of the user in hitting notes, the quality of his/her tone if supported, changes to his/her vocal range if desired, and tracks the user's practice history. The method/apparatus further provides features such as automatic vocal range detection, adjustment of lessons to a user's vocal range, and a display method that makes changes to the pitches of music notes clear during musical key/scale changes.

13 Claims, 24 Drawing Sheets

METHOD AND APPARATUS FOR MUSICAL TRAINING

RELATED APPLICATIONS

This application claims priority to U.S. Provisional Patent Application 61/586,749 filed Jan. 14, 2012 which is herein incorporated by reference in its entirety.

BACKGROUND OF THE INVENTION

1. Field of the Invention

Embodiments of the present invention relate generally to a method and apparatus for providing musical training.

2. Description of the Related Art

In ancient human tribes, it is believed that music was a group activity that everyone participated in. However, with the introduction of professional musicians and music as a professional field in general in recent centuries, our societies have been split into those who are deemed to have a talent for music and those who believe (or are told) that they don't have any musical talent. However, many people can develop a musical talent when trained by a teacher.

As a prior patent points out: "In music instruction, a student's aural perceptions are typically developed through collaboration with a music teacher who points out, by verbal comment and audible example, the pitch, timbral, and timing errors of the student. Teaching musical skills are complicated by the fact that sound, unlike paintings, cannot directly be seen and only exist when played. Audio tape recorders allow students to review their performances, but do not provide any analysis."

Over the years, there have been attempts to help singers and other musicians with their pitch perception. For example, U.S. Pat. No. 5,287,789 (the source of the quote in the previous paragraph) describes a tool to help singers with a line that shows their pitch and other vocal characteristics, while bars on a screen indicate the notes within a prerecorded or live musical sequence.

There also exist computer/console-based karaoke games, such as Rock Band (Harmonix Music Systems Inc.), Band Hero (by Activision Publishing Inc.), SingStar (by Sony Computer Entertainment Europe) that provide immediate pitch feedback on a singer's voice. The main shortcoming of such games is they are not designed for vocal training. These games assume fixed length songs that are in no way customized to the user's vocal skills (e.g. vocal range) and a design suitable for delivering voice lessons.

There also exist pitch-correction tools, such Melodyne by Celemony Software GmbH, that are designed for correcting pitch errors within prerecorded audio clips of singers and instruments. These tools show the pitches detected in the audio using pitch bars and pitch lines. Melodyne also provides a crude display of note heads on a non-conventional staff that is subject to ambiguous interpretation of note timing, and is suited to audio-mixing applications rather than voice/musical training.

There also exists various vocal training books (with audio CDs) and vocal training software with built-in voice lessons, but without pitch bars. These tools may be valuable for singers who are already confident that they are singing the correct notes, but not for those who are unsure if they are singing the correct notes or not (whether they are beginners or advanced singers). One of these tools, Voice Tutor by IMPACK Productions, provides pitch feedback using a needle (similar to the fuel gauge needle found in automobiles). Its needle design shows immediate pitch, which performs poorly when vocal vibrato is present, and can only show local pitch errors relative to a predetermined target note.

Some existing vocal training software (such as Singer's Friend by Robert Lumpkins) allows very limited customization of voice lessons to a user's vocal range. These software applications rely on limiting the range of the voice lessons to an exact range manually set by the user, without any regard for what the lesson is intended for, and assume the user already knows their own vocal range.

SUMMARY OF THE INVENTION

Embodiments of the present invention generally relate to a method and apparatus for providing instruction and feedback for voice and/or musical instrument training.

The method/apparatus allows a user to practice voice lessons, ear training lessons, songs, and/or various musical instruments. The method/apparatus displays a sequence of music notes to the user via a combination of conventional music staffs (such as a grand staff) and instances of a pitch-based representation. Instances of the pitch-based representation display target notes (if present) and the pitches measured from a live or recorded audio response in a format in which the location of the display elements correlate to the pitches they represent. The method/apparatus also displays the accuracy of the user in hitting notes, the quality of his/her tone if supported, changes to his/her vocal range if desired, and tracks the user's practice history. The method/apparatus further provides features such as automatic vocal range detection, adjustment of lessons to a user's vocal range, and a display method that makes changes to the pitches of music notes clear during musical key changes (key changes with or without scale changes—e.g. a change from A4-Major to A4-Minor or from A4-Major to B4-Major).

This summary highlights a few features of one embodiment of the method/apparatus. Different embodiments may support a different set of features as described in the rest of this document.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
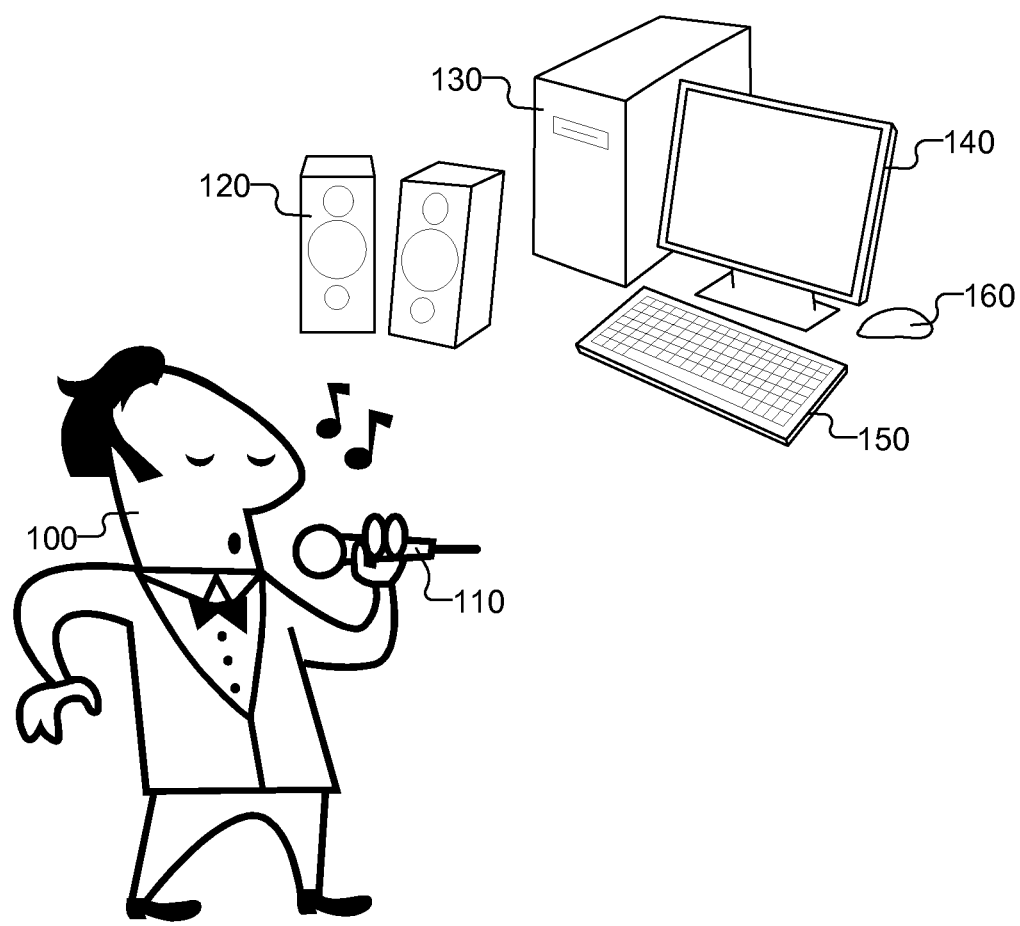
FIG. 1 illustrates selected details of an embodiment of a musical training tool using a desktop computer for the primary computation platform.

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. The invention encompasses all possible modifications and variations within the scope of the issued claims.

The term processor as used herein refers to any type of processor, central processing unit (CPU), microprocessor, microcontroller, embedded processor, media processor, graphics processor, or any other programmable device capable of executing and/or interpreting instructions in a form of software (such as microcode, firmware and/or programs), and includes multiple such units working together.

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

The terms 'Windows-based embodiment', 'WPF-based embodiment', and WPF-version are used interchangeably in the specification.

Key Terms

Note: A musical note

Key: Musical key.

Scale: A musical scale. While different cultures around the world use different scales, for purposes of explanation and simplicity the Western scales are generally implied in this specification. However, other scales may be used.

Relative note: An {octave offset, scale degree, accidental} triplet.

Absolute note: The absolute pitch of a note. A relative note can be converted to an absolute note if the absolute key is known.

Absolute key: A {key, octave, scale} triplet (for example C4-Major) that is used to convert relative notes to absolute notes. The term 'absolute key' is generally used in the context of a lesson, where it is used to convert the relative notes defined within the lesson to absolute notes. Each absolute key should be treated as a separate instance. In other words, two absolute keys that have the same triplet values are not the same absolute key. Octave numbering, key definition, and scale definition are arbitrary but may follow convention.

Sound wave: A short duration of sound waves (only long enough for the human brain or an electronic device to identify its pitch) that originate (or appear to originate) from a single sound source (e.g. the voice of a human being or a single string on a guitar).

Pitch: The perceived quality of a sound wave that varies with the fundamental frequency of the sound wave. According to other literature, pitch is roughly proportional to the logarithm of the fundamental frequency. Also according to other literature, if the fundamental (lowest harmonic) of a sound wave is missing, the human brain is capable of inferring its frequency from the frequencies of other harmonics present in the sound wave. Any device that detects pitch can take this into account to provide an accurate guess of pitch even if the fundamental is buried in noise.

To hit a note: Achieving an average accuracy of any value above 0. Average accuracy is described in various sections of this document.

Session: A more or less contiguous amount of time that the user spends with the musical training tool, typically with breaks of no more than 5-10 minutes.

Introduction

In one or more embodiments of the present invention a musical training apparatus and related usage methods are disclosed. The disclosed apparatus helps people learn how to sing, improve/maintain existing vocal skills, learn/improve sight singing, learn/improve musical hearing, and learn/improve understanding of music theory. A person using the musical training apparatus can practice at his/her own pace, without the need for a live teacher.

The disclosed musical training apparatus, or some of its components, may also be used in other fields and/or for other purposes. One embodiment of the musical training apparatus is designed to be extendible via third party lessons. Therefore, even such an embodiment is not limited to singing lessons and can be extended by a lesson designer (e.g. a third party) to provide, for example, violin lessons (a fretless instrument that relies on good pitch perception and scale knowledge).

Some of the benefits of the disclosed apparatus are to build and/or improve the user's: absolute pitch perception, ability to match pitch (either vocally or using an instrument), relative pitch perception (relative to a musical key, a musical scale, and/or another note), chord knowledge and ability to identify chords (both visually and aurally), scale knowledge and ability to identify scales (both visually and aurally), ability to read conventional staff notation, development of sight singing skills, understanding of rhythm and its representation in conventional staff notation, perception of arpeggios (chord notes played or sung in a sequence), quality of vocal tone (usually identified with resonance and an existence of singers' formants in a person's voice), vocal range (the lowest and the highest notes that the user can sing), richness of vocal skills (e.g. his/her ability to sing and quickly move between different styles, such as breathy tone, resonant tone, quiet tone, loud/shouting qualities, gritty/raspy tone, vibrato control, etc. with ease), vocal health, breathing technique for the purposes of singing, vibrato and control over vibrato, and music theory knowledge.

Furthermore, the disclosed apparatus helps eliminate muscle tension, vocal breaks (inability to hit some notes within his/her vocal range, e.g. between his/her vocal registers), and other bad habits that can have a negative impact on a user's voice.

A typical embodiment of the musical training apparatus comprises a computer with operating system and musical training software, an integrated or coupled computer display, one or more wired or wireless microphones, and one or more wired or wireless speakers. Examples of suitable computer include a desktop computer such as a Personal Computer (PC) executing Microsoft Windows operating system, or a 'Mac' computer executing an operating system such as OSX from Apple corporation, a smartphone such as an iPhone, Android phone or Windows phone, a tablet computer such as an iPad, Android tablet or Windows tablet, a portable computer such as a Windows or Mac laptop, a custom-built computation device or the like. In different embodiments, the musical training tool software executed by the computer (i.e. the software and its components such as media files) may be permanently stored on the computer, delivered from a network (e.g. the Internet) on demand, installed from a network (e.g. the Internet), or executed via some other means. In this specification, the term "musical training tool" is generally used describe the musical training apparatus or any subset of its components, regardless of whether the apparatus is also enabled to perform unrelated computing tasks.

FIG. 1

A person 100 (referenced as "the user" hereon in this specification) uses a computer 130 that is running the musical training tool software of the present invention, to improve his vocal/singing skills. Person 100 may be male or female. The person 100 uses a microphone 110 to interact with the computer 130. The microphone 110 may be wired or wireless, and can be of type that is capable of capturing human voice, even if only a portion of its frequency ranges. Microphone 110 may also be an integral part of the computer 130 (or any of its peripherals) such as in the case of many laptop computers. The person 100 uses feedback provided the musical training tool (such as pitch lines that are explained later in the document) to monitor his vocal performance and adjust his voice accordingly. The musical training tool provides feedback to the person 100 through its display 140, speakers 120, and/or other peripherals that are capable of providing information to the person 100. Display 140, speaker(s) 120, and other peripherals may be connected to computer 130 wirelessly or through a wire. Computer 130 may be collocated with the person 100 and display 140, or it may be remotely located. The person 100 uses one or more speakers 120 that are connected to the computer 140 to hear vocal training lesson, song, and/or other musical performance sounds. The sounds that person 100 hears may be prerecorded, generated on the fly, or downloaded/streamed from another source. The sounds that person 100 hears may include sounds of various instruments and/or human beings (such as a piano playing the notes that person 100 is supposed to sing/perform as well as additional chords to help person 100 get a sense of the musical key, and/or a singer/vocal teacher performing the exercises/songs that person 100 is supposed to perform/sing so that person 100 gets a better sense of what he/she is supposed to do). Speaker(s) 120 may be connected to computer 130 wirelessly or through a wire, and may be of type including headphones (as well as built-in speakers such as those that come with many laptops, displays, keyboards). Person 100 uses input peripherals such as a keyboard 150, mouse 160, and/or any input device (such as trackpad, touch display, etc.) to interact with the musical training tool software that computer 130 is running.

A common use scenario comprises the steps:

a) The user turns on the musical training tool (or starts the musical training tool software on his/her device).
b) The user selects his/her initial vocal range.
c) The user selects a training program.
d) The user selects the first lesson in the training program.
e) The user reads some information about what he/she is supposed to do within the lesson.
f) The user listens to an audio example of a trained singer performing the lesson.
g) The user presses the start button to start performing the lesson himself/herself.
h) The musical training tool starts playing audible notes and gives the user visual feedback about the pitch of his/her voice while he/she performs (or tries to perform) the lesson as instructed.
i) The lesson finishes.
j) The musical training tool gives some final feedback to the user about how the lesson went.
k) The user moves onto the next lesson in the training program.
l) When all the lessons in the selected training program are finished, the user takes a break for a day or two.
m) The user keeps using the musical training tool regularly to improve and/or maintain his/her vocal skills and views historical data provided by the musical training tool to see his/her progress over time.
n) The musical training tool updates the vocal range the user initially selected, based on his/her performance, as needed.

The above steps provide only one use scenario. As should be evident by the descriptions provided in this document, the musical training tool can be used for various purposes, in numerous different ways, and some of its novel components can be used in unrelated fields.

FIG. 2

Figure 2:
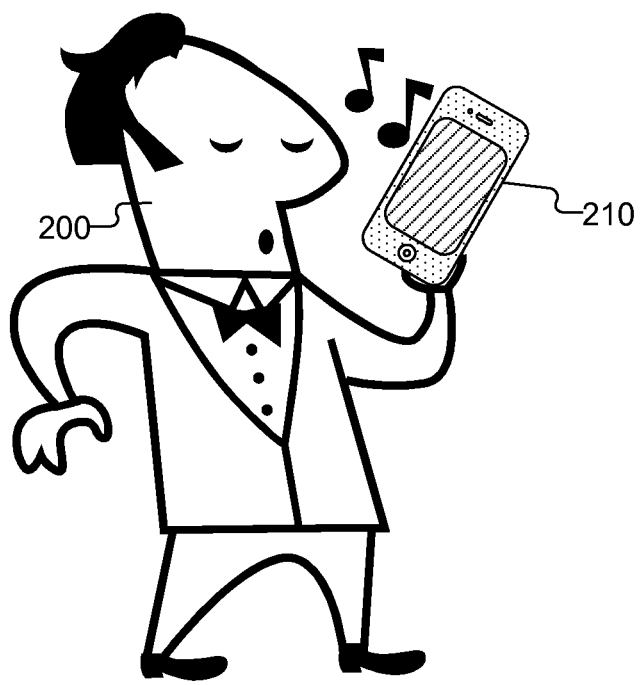
FIG. 2 illustrates selected details of an embodiment of a musical training tool using a smartphone for the primary computation platform.

FIG. 2 is similar to FIG. 1, but instead shows the user (person 200) using a mobile phone 210 to do musical training. Mobile phone 210 is considered to be a computer for the purposes of this specification. Similar to FIG. 1, computer 210 runs the musical training tool software. In this case the speaker, microphone, display, and the input device (a touch display) are all integral parts of the computer 210. Computers may come in all shapes and sizes; for the purposes of simplicity, descriptions in this document are generally limited to the types that are described in association with FIG. 1 and/or FIG. 2. However, in different embodiments other types of computers may be used, regardless of whether such computers are general purpose computers or custom-designed computer, currently invented or not, including those that may use Application Specific Integrated Circuits (ASICs) as opposed to general purpose microprocessors.

FIG. 3

Over the past centuries, many different notations have been invented by others for transcribing music. Out of these, a music notation 310, 320, 330 that originated in European classical music has become a world standard and is now used throughout the world by musicians of many different genres. This notation 310, 320, 330 (referred to as "conventional staff notation" and thus far but will be referenced as "standard staff" hereon forward) is the familiar 5-line staff that begins with a clef 340 (of which, there are many types, such as G-Clef, C-Clef, F-Clef, etc.), followed by a key signature 342, followed by a time signature 344, followed by symbols that represent periods of silence (rests) 346, notes 348, lyrics 350, and other musical symbols that are grouped into measures separated by bar lines 365 (shown as 365a and 365b). The location of the elements may vary and some of them may reappear as needed—for example a new time signature 344 may appear whenever the time signature of the performance changes. Note that other literature refers to standard staff by various names such as "modern staff notation" and "standard Western musical notation". Because standard staff notation has become a world-wide standard, many musicians would benefit from learning how to read it. However, standard staff 310, 320, 330 can be difficult to read for new musicians and singers, because of various reasons (for example because key signatures alter the meaning of staff lines). While some existing methods aid singers via pitch bars, none are integrated with standard staff-based sheet music notation. Musicians of various experience levels, including absolute beginners would benefit from a new music notation that unifies all the elements of standard staff 310, 320, 330 with the benefits of a pitch-based representation.

Figure 3:
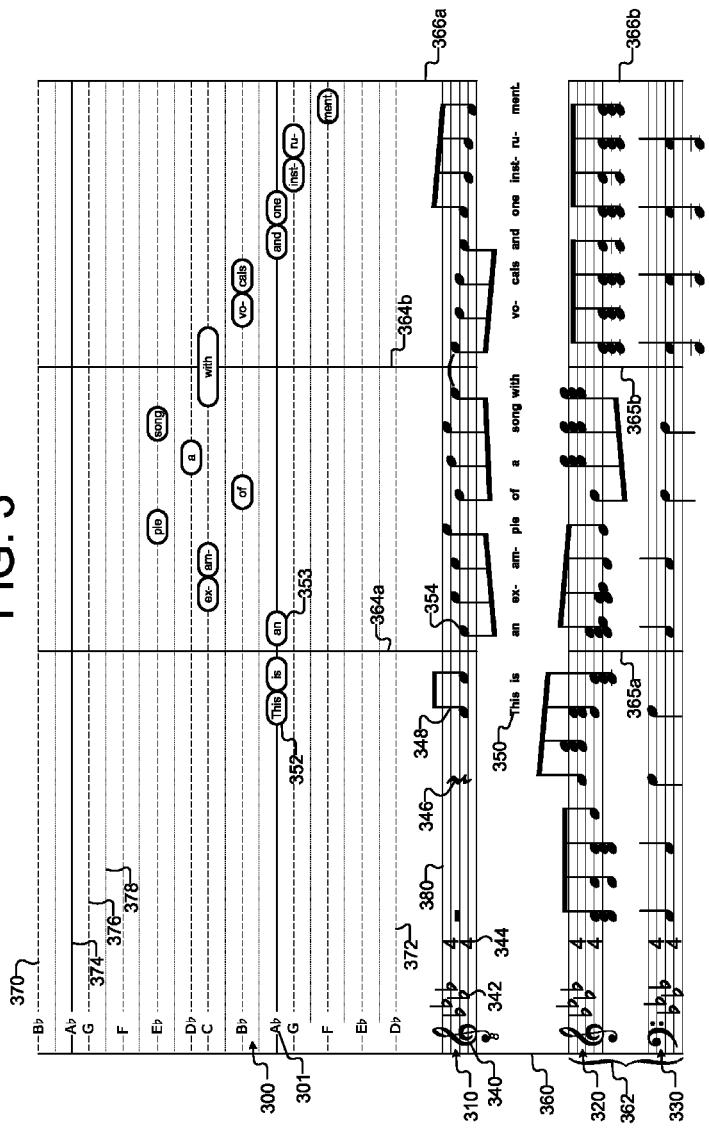
FIG. 3 illustrates a general depiction of a unique staff notation.

Therefore, a new staff notation 300 (300 is the rectangular area enclosed by the lines 360, 370, 372, and 366a) that combines standard staff notation 310, 320, 330 with a new pitch staff notation 300. Pitch staff 300 is herein presented as an integral addition to standard staff notation; therefore embodiment disclosed herein follow the common conventions for drawing standard staffs, unless otherwise noted. The addition of a pitch staff 300 does not take away from any existing features/conventions of standard staff notation, i.e. any elements that may be drawn as part of standard staff notation, however common or uncommon, are still valid and can be used freely (e.g. symbols that show tempo, how loudly the notes should be performed, direction of strumming, accents, chord names, guitar chord fingering charts above a staff, etc.). FIG. 3 shows three standard staffs 310, 320, 330 for illustrative purposes only; the actual number of standard staffs can be anywhere from zero to as large a number as one wishes. Similarly, FIG. 3 shows one pitch staff 300 for illustrative purposes only; the actual number of pitch staffs can be anywhere from zero to as large a number as desired.

In an embodiment, pitch staff 300 displays the key signature in a different format than a standard staff key signature 342. A standard staff key signature 342 does not provide precise information on the scale or the tonic that are used, unless either is explicitly noted in text (for example the key signature for C-Major looks the same as A-Minor, as well as other musical modes of other keys). The pitch staff 300 remedies this problem by providing precise tonic and scale information. Pitch staff 300 achieves this in two ways. Firstly, it displays all the notes that are part of the key signature using their written representations 301 (for example using letters such as C, D, E, F, G, A, B for English, words such as Do, Re, Mi, Fa, Sol, La, Si for some other languages, scale degree numbers such as 1, 2, 3, 4, 5, 6, 7 or I, II, III, IV, V, VI, VII for theoretical studies, etc., any of which may also include sharp/ flat signs as dictated by the key signature). Secondly, the pitch staff 300 makes the tonic and the scale explicit by marking the tonic and the various degrees of the scale differently (e.g. via different line colors/thicknesses as described in the next paragraph, or using different text styles/colors for the note names 301). For example, the pitch staff 300 in FIG. 3 is set to A♭-Major. Note that the designer of each lesson decides what scale and what absolute key(s) (which also indicate the tonic) should be used for each pitch staff 300 by specifying that information in the lesson's definition (for example, a lesson designer may choose to present a minor arpeggio on a pitch staff 300 that is set to a major scale, a minor scale, or some other musical mode). Optionally, octave information may be included in the written representation of the notes (e.g. C4 instead of C). Octave information/separation may also be presented using techniques such as braces to the left of pitch staff 301, via different background coloring of each octave on all the areas of pitch staff 301 that represent that octave, etc.

The pitch staff 300 consists of an arbitrary number of horizontal lines (such as line 374, line 376, line 378), each of which corresponds to a semitone, ordered from the line 372 that corresponds to the semitone with the lowest pitch at the bottom to the line 370 that corresponds to the semitone with the highest pitch at the top (some embodiments may reverse the ordering, although this is not recommended). The lowest semitone 372 and the highest semitone 370 may be fixed, or dynamically determined from e.g. the musical contents of the pitch staff 300, the user's current vocal range, a violin's range, or some other parameter (the designer of each lesson decides what the values of lowest semitone and highest semitone should be or how they should be calculated). The vertical location of each semitone line (such as line 374, line 376, line 378) is determined by the semitone's pitch (exact or approximate) as perceived by a human listener. The human brain perceives pitch on a logarithmic principle and therefore the vertical position of each semitone line relative to the lowest semitone line 372 can be calculated using the formula: $C*\ln(f/f_r)$, or an approximation of it, where f is the fundamental frequency of the semitone for which the vertical location is being calculated, fr is the fundamental frequency of the lowest semitone 372, and C is any positive or negative real number that is ideally (but not necessarily) kept constant within a single pitch staff 300. For Western music using equal temperament, this corresponds to an equal distance between adjacent semitones (the actual distance can be adjusted as desired by using different values for C). Each occurrence of the tonic (first degree of the scale) 374 is drawn in a similar style (or with a slightly higher intensity) as standard staff lines 380 (e.g. using a similar or darker color, using a similar or thicker line thickness, or using a similar or more opaque transparency). Lines 376 that correspond to all other degrees of the scale are drawn to be less prominent compared to the tonic line 374 (e.g. using fainter colors, higher transparency, thinner lines, etc.). Lines 378 that correspond to semitones that do not exist in the scale are drawn to be barely noticeable (e.g. using very pale, very transparent, or very thin staff lines). These ghost lines 378 are drawn to be barely visible so that they are only perceived when the user is expecting a note/semitone in their location. Note that the choices described here represent just one embodiment; in other embodiments, different scale degrees (including the tonic) may be assigned completely different colors, brightness, transparency, thickness, or may entirely be omitted, in order to highlight various scale degrees, such as the dominant and subdominant, and/or to downplay others. Also, a semitone line (e.g. line 374, line, 376, line 378) may be drawn to be as thick as the whole height of the semitone it represents, turning it into a bar (e.g. resulting in a stack of colored bars).

Although some of the discussions in this specification (such as the above description) use semitones, which is a concept of Western music scales where 12 semitones make up an octave, the discussions apply equally to other scales and tuning systems that may use different note/tone spacing and/or temperaments. The recommended approach in all cases is to calculate the vertical location of each horizontal line such that it corresponds to the perceived location of the corresponding note/tone as humans hear it (for which, the same fundamental frequency to vertical position conversion formula provided above can be used).

In this new notation, a pitch staff 300 can be inserted above (or below) any standard staff (e.g. above the vocals' standard staff 310 as in this case) to provide a chromatic representation of the same musical content that the corresponding standard staff 310 contains. Either or both staff types can be omitted for any instrument as desired. Other notations that are typically coupled with standard staff 310, such as tablature notation, may be inserted for any instrument as desired. When a pitch staff 300 and standard staff 310 are paired, the pitch staff 300 does not necessarily need to display all the notes that are present in the standard staff 310 and may omit some depending on the desired goal of the transcription (for example the designer of a voice lesson—a.k.a. singing lesson—may decide to display some of the chords that prime the user's ears after a key change—a.k.a. cue chords—but may choose to do so without using an additional standard staff 320 and instead place these chords on the same standard staff 310 that contains the notes that the user is supposed to sing, and make it clear to the user that he/she is not supposed to sing the chords by omitting them in the pitch staff 300).

Pitch staff 300 contains zero or more note bubbles (such as note bubble 352 and note bubble 353) to represent the notes that are assigned to it. No bubble is drawn for periods of silence (e.g. no bubble exists for the rest 346). The design of these bubbles 352 can be varied (e.g. rectangles, rectangles with rounded corners, 3D glass-like looking bubbles, ellipses—solid or hollow, with or without stems—similar to standard staff note heads, etc.) and they may optionally contain (inside, above, or below themselves) the lyrics 350 of the performance, as seen in note bubble 352. The word "lyrics" as used herein refers to written representations of the sounds that are used in vocal (singing) lessons as well (e.g. a "sss" for breathing out, a "brrr" or a "rrr" for a lip trill, etc.).

The horizontal location where a note bubble 352 starts may be offset by a small amount in either direction relative to the corresponding note head 348. A small negative offset (visible in the horizontal position of note bubble 353 and note head 354 relative to the bar line 364a to their left) is used, which provides a natural feeling to the combination of the staffs during a live session. The width of note bubbles 352 is discussed in association with FIG. 4.

In standard staff notation, a single vertical line 360 attached to the left of multiple staffs is used to combine staffs that correspond to the same point in time (i.e. whose contents should be played simultaneously). The rules for drawing this first vertical line 360 (as well as any brackets and braces 362 to its left) apply equally to pitch staffs 300, as if they too were standard staffs. Although not generally recommended, some embodiments may draw the vertical line with gaps in it between different staffs. Brackets, braces 362, and any other additions are optional.

Bar lines (such as bar lines 364, shown as 364a and 364b, and bar lines 365, shown as 365a and 365b) are used to group notes on the staffs into measures. The rules for drawing the standard staff bar lines 365 apply equally to pitch staffs, as if they too were standard staffs. If both a pitch staff and a standard staff exists for the same vocal/instrument track, the bar lines 364 extends from one staff to the other as shown in the figure; however this is optional and some embodiments may choose to have a gap in the line between the pitch staff 300 and the standard staff 310.

In some alternative embodiments, if no standard staff is used for any track/instrument (and hence the time signature 344 is not visible), bar lines 364 may be omitted from pitch staffs, or a smaller/larger number of them may be used to present less/more detailed information about the performance's time signature 344. An example of the latter for a 4/4 time signature would be to draw three additional vertical lines (parallel to bar lines 364 and with the same length) between every pair of bar lines 364a and 364b, creating four slices of equal width for each measure (the number of slices in such a case can be varied as long as it is compatible with the time signature—e.g. 4/4 time signature can also be split into only two slices). The visual representation (e.g. color, thickness, brightness, transparency, etc.) of the additional vertical lines may be varied in order to represent the emphasis of the different beats in the time signature (e.g. by drawing thicker lines for the emphasized beats of the time signature).

Bar lines 364 may use the various bar line styles supported by standard staff notation, however common or uncommon, such as double lines with dots for sections that need to be repeated.

The drawing rules for the last bar lines 366 (shown as 366a and 366b) are similar to the rules for drawing the bar lines 364 (and bar lines 365) that separate measures. Two notable differences are, if desired, the last bar line 366 may be extended across all staffs similar to the first vertical line 360), and the last bar line 366 may have more styles available to it from standard staff notation, such as bar line styles that mark the end a score (e.g. a double line made up of a thin and a thick line).

Many music lessons, especially for vocal training, rely on repeating the same material across many different keys (e.g. a range of keys that are within the user's vocal range). Pitch staff 300 is especially powerful in these scenarios, as it allows for seamless key changes without requiring a redrawing of all the elements. Although different embodiments may redraw everything whenever the key changes (e.g. to resemble the page changes of a book) and/or lay out the lesson content for all absolute keys horizontally next to each other and scroll through them horizontally, one embodiment is as follows whenever the key changes while the musical content (relative notes and their durations) remains the same:

Before key changes start:
  A fixed amount of space is reserved for the key signature 342. The amount is determined by the widest key signature that will (or may) be used. This allows all other elements to maintain their horizontal position during key changes.
  A fixed amount of vertical space is reserved in each standard staff 310, 320, 330 for the full range of notes that will be displayed across all keys in that specific staff. If desired, some of the blank space between standard staffs perhaps shared among them, as long as there won't be an overlap of their contents.
During each key change:
Note bubbles 352 slide into their new locations.
Pitch staff lines 374, 376, 378 and their written representations 301 for the original key fade out, and pitch staff lines and their written representations for the new key fade in (different animations may also be used).

The horizontal lines of standard staffs 310, 320, 330 remain in place.

All bar-lines 360, 364, 365, 366 remain in place.

The old key signature 342 fades out; the new key signature fades in.

Standard staff notes 348 either slide into their new vertical location, or they fade out at their original locations and fade in at their new locations (their new locations will be the same on the horizontal axis, but may or may not be different on the vertical axis, depending on the key signature).

Figure 4:
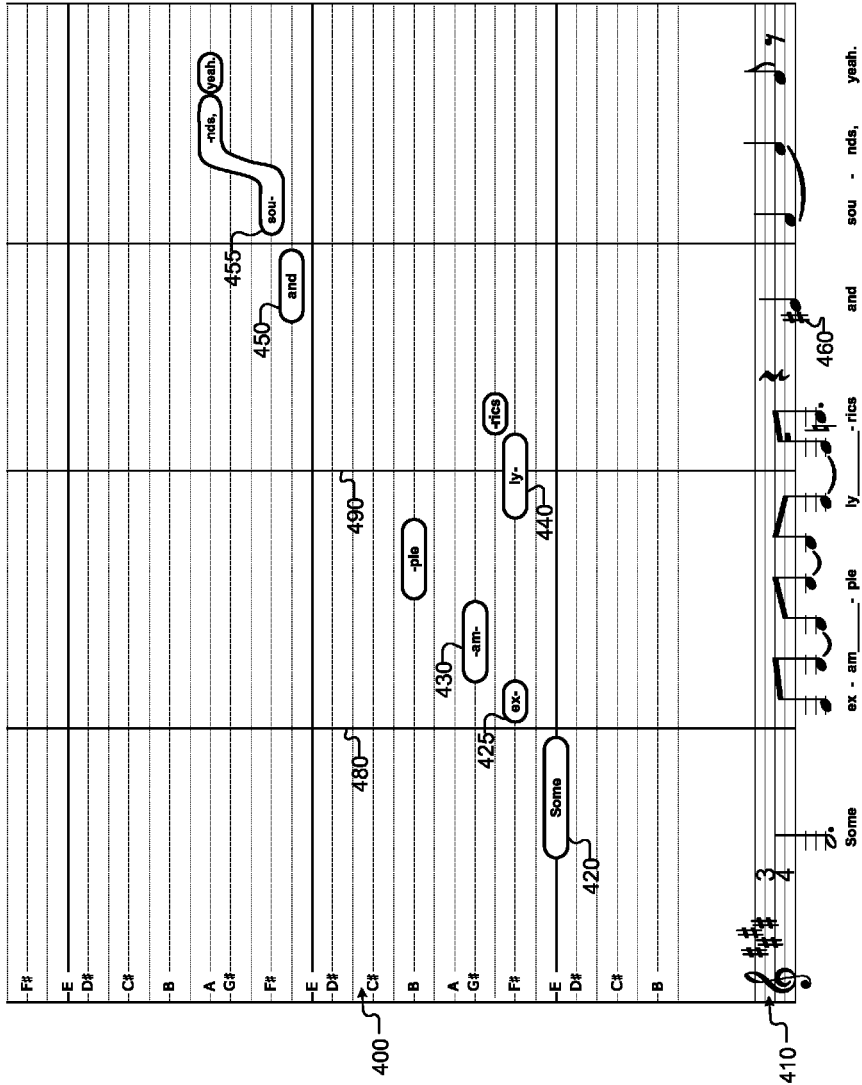
FIG. 4 illustrates select details of the unique staff notation.

Any accidentals that are not needed any more fade out (i.e. natural, sharp, flat, double-sharp, double-flat signs in front of note heads—such as accidental 460 of FIG. 4).

Any new accidentals that are needed fade in (i.e. natural, sharp, flat, double-sharp, double-flat signs in front of note heads—such as accidental 460 of FIG. 4).

Time signatures 344, if present, remain in place.

Silence (rest) symbols 346 remain in place.

Clef symbols 340 remain in place. Although not recommended, alternative embodiments may also change the clef; if the clef is changed, the old clef symbol fades out and the new clef symbol fades in.

In the above descriptions, different embodiments may use different animations, or they may do the transitions at once without any animation.

When at least one standard staff 310 is used for a music lesson that repeats the same performance across multiple absolute keys, the following technique may be used to reduce the amount of horizontal space that the staffs 300, 310, 320, 330 take up (for example if screen space is limited, such as in the case of a smartphone):

No dedicated space is allocated for time signature 344, thereby shrinking the horizontal span of all staffs (including pitch staff 300, because the horizontal axes of all staffs are synchronized).

In a static preview of the lesson (e.g. before the performance starts or after it ends):

Absolute key is set to a C-Major (in any octave that is within the valid range of absolute keys that will be used within the lesson), thereby resulting in a key signature 342 that has no sharps or flats (i.e. one that has no visible representation).

Time signature 344 is displayed in the same horizontal space as the key signature 342. Because the absolute key has been set to a C-Major, the key signature 342 won't have any visible content until key is changed.

When key changes start:

Time signature 344 is removed from the display (e.g. using a fade out animation), leaving the space it occupied for key signature 342.

The total vertical space that is used by the staffs may be reduced as well, without changing the actual range of semitones that are displayed by each, by using the following technique:

Pitch staff 300 is placed in a scrollable view container, so that the user observes only a vertically-limited portion of pitch staff 300 at a time.

Independent horizontal scrolling of pitch staff 300 relative to standard staffs 310, 320, 330 is not allowed.

During key changes, the scroll view may be automatically scrolled if desired.

Note that the vertical space discussion above is about placing each pitch staff 300 in a scrollable view container of its own. If all staffs are placed in a scroll view container—as may be done in some embodiments—they may all be scrolled horizontally (as may be desired if their contents are for a song or a lesson that contains a long sequence of notes) and/or vertically together. Also note that another way to decrease the total vertical space that is required by the staffs is to limit the range of notes that they each display.

Alternative embodiments may also reduce the vertical space that is required by a pitch staff 300 by dynamically modifying the lowest displayed semitone 372 and the highest displayed semitone 370 during each key change and keeping the distance between the lowest displayed semitone 372 and the highest displayed semitone 370 constant, such that the vertical location of the horizontal semitone line that corresponds to the currently selected absolute key of the performance is constant within the pitch staff 300. Many embodiments of the musical training tool do not use this technique, so that the user can see where their pitch lines (discussed later) are, even if they are off target by a relatively large margin.

FIG. 4

FIG. 4 shows additional features of the new pitch staff notation. Note bubbles are not split on pitch staff 400 the way they sometimes are split on a standard staff 410 to fit the time signature (i.e. in cases where a single note is supposed to be performed, but it is split to multiple note heads connected by a tie in the standard staff representation). See note bubble 430 and note bubble 440, and the corresponding notes on standard staff 410 for examples of this.

When two or more notes are to be sung legato, their note bubbles may be connected to each other as shown by legato bubble 455. This indicates that the notes are played and/or sung smoothly and connected. This is optional and may not be supported in all embodiments. The actual visual design of the note bubbles may vary and their sliding sections may be shaped as lines for simplicity. If desired, the slope of a sliding section may indicate how quickly the transition from one note to the other should be made.

In the remainder of this section, the term "time-scale" is used to refer to the mapping from time (which may be measured in beats, seconds, or any other unit of time) to a horizontal position (which may be measured in pixels, points, millimeters, or any other unit of distance). In addition, the term "conventional standard staff notation" refers to standard staff without any additions/extensions/modifications provided by this specification.

In conventional standard staff notation, it is common to use a non-linear time-scale in two ways: Firstly, notes get spread out when the drawing gets dense, so that note heads and/or any accidentals don't overlap with each other. Secondly, (even when the drawing is not dense) notes are given an amount of space that is based on, but is not linear to, their duration. For example if a note that is four beats in duration gets N units of horizontal space, a note that is one beat in duration may get N/3 units of space as opposed to N/4.

In light of no standardization on the amount of space that must be used for different note durations; the actual amounts of space likely vary among the uses of standard staff in existing methods. By contrast, existing pitch-based representations generally use a linear time-scale. In the present design three different time-scales are supported. In all of these, time increases from left to right and is kept in synch across all staffs. Each is explained below:

Linear time-scale: In this embodiment, the time-scale is completely linear, i.e. it increases uniformly from left to right, regardless of the density of the notes. This makes standard staffs using linear time-scale look a little different than conventional standard staff notation. However, when real-time pitch tracking is used, any pitch lines/indicators move evenly on the pitch staff 400, which may be more pleasing to some users. This is the ideal mode when pitch-tracking is performed and no standard staff 410 is displayed. In this case note bubbles 420 and 425 would touch each other and the bar line 480 if it is present.

Semi-linear time-scale: In this embodiment, the time-scale is linear as described above, except for the parts where the bar lines are. The time to horizontal position mapping is done as described below, using the note bubble locations on pitch staff 400. Where there is a rest, the description/calculations should be treated as if the rest were a note and a note bubble existed for it. The term "note/rest bubble" is used to refer to this case; the reader should remember that a rest bubble may be invisible.

The time-scale starts accelerating $T_a$ amount of time before the end of the last note/rest bubble in a measure (e.g. note bubble 420 or note bubble 450) and decelerates back to its normal rate when it reaches the beginning of the first note/rest bubble in the next measure (e.g. note bubble 425 or note bubble 455). $T_a$ can be selected dynamically from the set of real numbers between 0 and D, where D is the duration of the last note in the measure, or it can be a fixed duration that is shorter than or equal to duration of the shortest note/rest bubble (duration-wise) that is currently displayed on pitch staff 400.

If a note 440 is split by one or more bar lines 490, the acceleration is calculated as if each split part of the note 440 was a separate note.

Alternatively, the calculations of the non-linear time-scale below may be used for this case as well. Because the calculations are based on note/rest bubble locations, when applied to this case, they will generate a natural feeling semi-linear time-scale.

Non-linear time-scale: In this embodiment, standard staffs 410 are drawn using conventional horizontal spacing (the same way that conventional standard staff notation works). This usually results in a completely non-linear time to horizontal position mapping in all staffs, including the pitch staff 400. FIG. 4 shows this case, where it is evident that the widths of the displayed measures/bars aren't equal. It can also be seen that the width of the pitch bar 420 is not three times the width of the pitch bar 450, even though the duration of note 420 is three times the duration of note 450 (as can be seen in the corresponding notes on standard staff 410). This non-linear time-scale is ideal when the standard staff 410 is desired to obey conventional norms or when there is limited space for the drawings (such as the screen of an iPhone). The time to horizontal position mapping is done as follows (the term "note/rest bubble" is defined the same way as in the semi-linear time-scale discussion):

Whenever there is no gap between the current note/rest bubble and the next note/rest bubble, a linear time-scale is used from the beginning of the current note to the end of it. This can be represented via the following equation:

$$x = x_{s1} + (x_{e1} - x_{s1})\frac{t - t_{s1}}{t_{e1} - t_{s1}},$$

where t is current time,
x is the calculated horizontal location that corresponds to time t,
$t_{s1}$ is the start time of the current note,
$t_{e1}$ is the end time of the current note,
$x_{s1}$ is the start location (left edge) of the current note, and
$x_{e1}$ is the end location (right edge) of the current note.

Whenever there is a gap between the current note/rest bubble and the next note/rest bubble, a linear time-scale is used from the beginning of the current note/rest bubble to $T_a$ units of time before its end, and an accelerated time-scale is used from $T_a$ units of time before the end of the current note/rest bubble to the beginning of the next note/rest bubble, where $T_a$ is defined as before.

The first portion from the beginning of the current note/rest bubble to $T_a$ units of time before its end uses the same equation as the no-gap case above.

The second portion from $T_a$ units of time before the end of the current note/rest bubble to the beginning of the next note/rest bubble uses the following formula:

$$x = x'_{e1} + (x_{s2} - x'_{e1})\frac{t - t'_{e1}}{t_{s2} - t'_{e1}},$$

$$\text{where } x'_{e1} = x_{s1} + (x_{e1} - x_{s1})\frac{t'_{e1} - t_{s1}}{t_{e1} - t_{s1}},$$

t is current time,
x is the calculated horizontal location that corresponds to time t,
$t_{s1}$ is the start time of the current note,
$t_{e1}$ is the end time of the current note,
$t_{s2}$ is the start time of the next note,
$t_{e2}$ is the end time of the next note,
$x_{s1}$ is the start location (left edge) of the current note,
$x_{e1}$ is the end location (right edge) of the current note,
$x_{s2}$ is the start location (left edge) of the next note,
$x_{e2}$ is the end location (right edge) of the next note, and
$t'_{e1} = \text{Max}(t_{e1} - T_a, t_{s1})$.

Optionally, if a note/rest bubble 440 is split by one or more bar lines 490, the time-scale may be calculated as if each split part of the note/rest bubble 440 belonged to a separate note (i.e. as if there was no tie in the corresponding note on standard staff 410).

Different embodiments of the pitch staff notation may use various different algorithms to do the mapping for the time-scale, however the essence of the design remains the same: the use of a mixture of pitch staffs and standard staffs that are synchronized to each other without sacrificing the non-linear time-axis of conventional standard staff notation, while maintaining a natural feeling flow of time across all staffs. The approach that is described under the non-linear time-scale case above presents one such solution that keeps the time-scale contiguous (i.e. no breaks/jumps in x). This allows, for example, the pitch lines that will be described later in this document to look contiguous and free of any artificially introduced bends and/or breaks in them (although bends and breaks may appear if they are part of a user's performance).

The way that time-scale works in the accelerated portions described above can be linear as described (i.e. any acceleration at the beginning of an accelerated region is instant and the following velocity throughout the accelerated region is constant), or it can follow an acceleration/deceleration curve. The same argument also applies to the non-accelerated portions that are described. However, excellent results and a natural feeling has been achieved in implementations using the linear mappings shown above for the accelerated regions, so although some embodiments may use acceleration/deceleration curves, a linear mapping has been proven to work very well too.

FIG. 5

Figure 5:
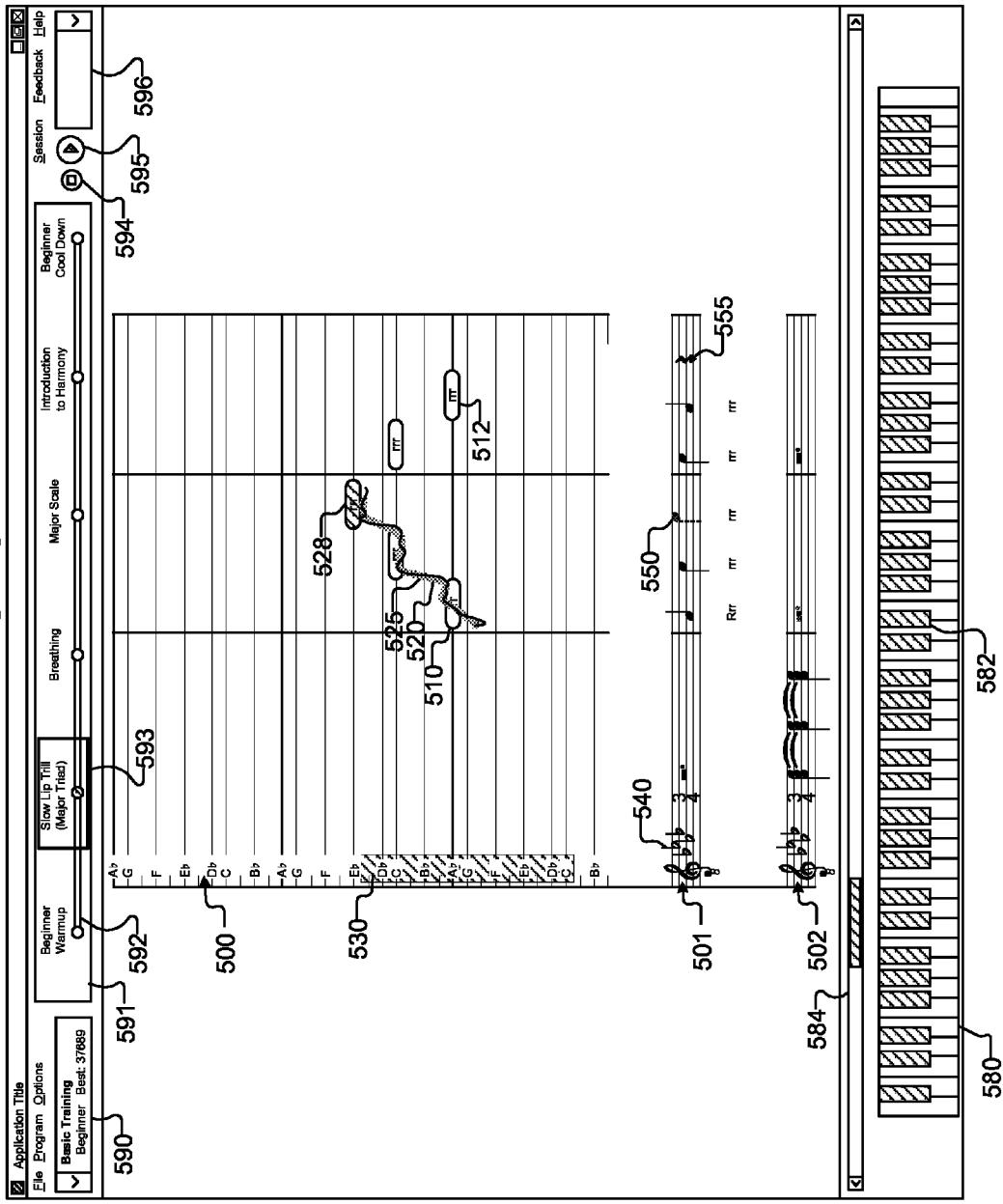
FIGS. 5, 6, 7, 8 and 9 depict a personal computer display during a live performance of a lesson.

FIG. 5 shows a screen image (converted to a line drawing) from a working embodiment of the musical training tool that consists of a desktop PC running Windows, an external USB microphone, a display with attached stereo speakers, a computer keyboard, a computer mouse, and a Windows(WPF)-based implementation of the musical training tool's software components running on the computer.

This embodiment comes with a variety of lessons that target voice, ear, and harmony training, as well as sight singing. The lessons are designed as add-ons (using the standard mechanisms provided by the operating system and the .NET/WPF frameworks). This approach allows third parties such as vocal teachers to develop new lessons and training programs (explained below) that can be added to the available list of lessons and training programs within the musical training tool. Some of the third party content is sold from within the application (which, alternative embodiments may sell using out-of-application means) for an additional fee (one time or subscription-based), and the third party who designed the specific lesson and/or training program is given a share of the earnings from the sale of his/her own training program. This business model is used to aid in the promotion/marketing of the musical training tool by giving vocal teachers and/or other third parties a reason to promote the musical training tool. Some embodiments may also allow the user to create new lessons and/or edit existing ones.

The lessons are organized into various categories, such as Warm-ups, Cool Downs, Vocal Training, Harmony Training, Ear Training, etc. (actually in the shown version of the musical training tool, the lessons are organized into subcategories, which are then organized into categories; this is so that lessons under a category such as "Vocal Training" can further be organized into groups). However, because many users may not necessarily know what lessons to practice and in what order, the concept of training programs has also been introduced. A training program consists of an ordered list of lessons, as well as a name and a description, and may be created by the developer of this tool or by a third party who designs/develops new lessons. The lessons within a training program are sorted in the order the developer of the training program intends them to be practiced, and a lesson may appear more than once within the same training program. A lesson may also appear in multiple different training programs. For example, some of the warm-up/cool-down lessons would likely be shared like this by various training programs.

Combo box 590 allows the user to select a training program and displays the currently selected training program (for example, in FIG. 5, the name of the selected training program is "Basic Training"). The box 591 shows the lessons that are contained within the currently selected training program. A selection indicator 593 shows the currently selected/displayed lesson.

The user can create new training programs using the lessons that are built into the musical training tool, download new lessons for a fee, or create his/her own lessons (which can be unlocked for an additional fee). The user can also reorder the lessons within a program by dragging and dropping them within box 591. Box 591 can be scrolled horizontally when the training program contains more lessons than fit the box. A portion of the bar 592 gets filled below any lesson that has been practiced in the current session. When the user practices the lessons in order, this gives the bar an affect that makes it look like it is filling up from the left. This allows the user to keep track of what lessons he/she has already practiced, and what lessons are coming up ahead.

The software synthesizes the notes shown on standard staff 501 (which are also shown on pitch staff 500) and standard staff 502, and plays them through the speakers. The notes are synthesized using pre-recorded piano samples (for which there is plenty of prior art). Other types of synthesizers may also be used for this purpose, including those that don't rely on pre-recorded samples. The piano keyboard 580 at the bottom shows any currently playing note(s) 582. In sections where there are chords, multiple piano keys are depressed. In sections where there are silences (rests) 555, no piano key is depressed.

In the lesson shown in FIG. 5, the bar-lines are not extended between the pitch staff 500 and standard staff 501 for aesthetic reasons, to make the transition between the staffs more prominent when standard staff 502 is hidden. In addition, standard staff 502 is hidden in many lessons in order to provide more space for the other staffs. All staffs are scaled to fit the available space completely, such that if the whole window is resized—or a staff such as standard staff 502 is hidden—the rest of the staffs get larger (proportionately, corresponding to a larger zoom level). Similarly, if a wider range of absolute notes are displayed on pitch staff 500, then all the staffs shrink proportionately. Rendering of all shapes and text is done using vector-based techniques in order to keep the display sharp regardless of the zoom level (rendering scale).

Among other things, each lesson definition contains the following information:

- One or more tracks. Each track contains a set of relative notes (some of which may overlap, e.g. to form chords), and their start and end times. Each track also contains a flag that indicates whether the track is indented to be performed by the user. This flag is referred to as IsUserPart in this specification.
- One or more time signatures. The time signature may change in any measure. Each time signature also specifies a tempo, which may or may not change from one time signature to another. Some embodiments may allow the tempo of all time signatures to be modified, e.g. by multiplying them by a user-defined tempo override factor.
- The order and type of staffs to use, which ones should be connected to each other via extended bar lines, what track(s) each staff should display (a single staff may display multiple tracks), and which tracks, if any, should be hidden by default. Hidden tracks may be displayed at the user's request.
- Background texture to use for the area between the piano keyboard 580 and the top panel that contains box 591.
- Background colors/textures for each staff (which allows for transparent colors to be used to highlight different staffs if desired).
- What software synthesizer, if any, to use to synthesize the notes of each track.
- Background audio, if any, that should be played while the lesson is being performed.
- Which staffs support pitch-feedback (pitch feedback can be displayed by standard staffs as well, as described elsewhere in this document). This setting can be overridden by the user if allowed by the lesson developer.
- The default value of whether metronome sounds should be played. If enabled, metronome sounds play in sync with the time signature (which may be fixed throughout a lesson, or may change multiple times for each absolute key). This setting can be overridden by the user.
- Whether the lesson should be considered in an automatic expansion/reduction of the user's selected vocal range (discussed in later paragraphs).

An ordered list of absolute keys that should be considered for the lesson (the same absolute key may appear multiple times—in various locations—in this list).

The following parameters that control absolute key selection:

$\Delta N_l$: Number of semitones that are allowed to exceed user's lower range $\Delta N_u$: Number of semitones that are allowed to exceed user's upper range $\Delta N_{ua}$: Number of additional semitones that are allowed to exceed user's upper range after the start of lesson (after first key selection)

$\Delta N_{la}$: Number of additional semitones that are allowed to exceed user's lower range after the start of lesson (after first key selection)

The actual implementation of how and exactly what information is stored can vary, as long as ideally the above information/parameters can be derived from it.

An embodiment of the musical training tool automatically lays out the notes on each standard staff according to the time signature(s) specified in the lesson's definition, and hence keeps the definition of the notes within each lesson free from standard staff formatting details. However, supporting automatic layout is optional, and other embodiments may require the lesson designer to explicitly specify how standard staff notes should be laid out. There are plenty of other software tools that do automatic layout of notes on a standard staff; therefore, it is assumed an engineer of ordinary skill can implement such a feature.

Out of the list of absolute keys that are specified for a lesson, the musical training tool picks the absolute keys that fit a certain criteria for use during the lesson's performance. To do this, the musical training tool goes through all the absolute keys in the order they have been specified in the lesson's definition and applies the following criteria to each absolute key. If the criteria for an absolute key are not met completely, then the absolute key is not used during the lesson's current performance.

Every relative note that is on a track that is marked with the IsUserPart flag must meet one of the following equations:

$U_l - \Delta N_l \leq x \leq U_u + \Delta N_u$, if no absolute key has qualified yet $U_l - \Delta N_l - \Delta N_{la} \leq x \leq U_u + \Delta N_u + \Delta N_{ua}$, if at least one absolute key that precedes the currently tested absolute ey has qualified (i.e. meets these criteria).

In the above equations, x represents the fundamental frequency of each relative note after it is converted to an absolute note using the current absolute key (remember that an absolute key specifies a {key, octave, scale} triplet and a relative note specifies an {octave offset, scale degree, accidental} triplet, which can be combined to calculate an exact absolute note). Furthermore, $U_l$ represents the lower boundary of the user's currently selected range and $U_u$ represents the upper boundary of the user's currently selected range. Note that the user's selected vocal range may be different than his/her actual vocal range, and it may have been automatically determined by the software or manually specified by the user.

Negative values of $\Delta N_l$ and $\Delta N_u$ allows the lesson's range to be more limited than the user's current vocal skills and is useful for warm-ups/cooldowns, or when the sounds that are to be performed can be difficult near the upper and/or lower boundaries of a person's vocal range (not all vocal training sounds are as easily reproduced, and the use of these variables can greatly reduce the risk of injury to user's vocal cords or throat).

Positive values of $\Delta N_l$ and $\Delta N_u$ allow the lesson's range to be wider than the user's current skills, and are intended for range-extension lessons where the extremities of a user's vocal range are pushed (recommended only after a warm-up). This allows the user to experience and practice new notes, and allows the musical training tool to automatically extend the user's vocal range if the user is able to correctly hit these notes.

The musical training tool can expand or reduce the user's selected vocal range (unless automatic modifications are disabled by the user) based on the notes that the user is able to hit or not hit. Depending on user settings or built-in settings, an expansion/reduction of the user's vocal range may be attempted during a lesson, after every lesson, after every session, or after certain periods of time. Experimentation has demonstrated that it is better to be aggressive with expansion (i.e. anytime the user hits a note, expand the range) and not to be aggressive with reduction (i.e. wait for the user to fail to hit a note multiple times or for multiple sessions before deciding to reduce the selected vocal range). Of course these are only recommendations, and different embodiments may use different levels of aggressiveness/passiveness when it comes to automatically updating the user's selected vocal range.

$\Delta N_{la}$ and $\Delta N_{ua}$ allow for further flexibility in range-extension lessons, such that absolute notes at the extremities of a user's vocal range are attempted only after the user has already sung the relative notes specified in the lesson through a few absolute keys that are within his/her vocal range. Combined with negative values of $\Delta N_l$ and $\Delta N_u$, these parameters allow a lesson to start on easier absolute keys for the user and get aggressive as the lesson progresses.

One can come up with many other algorithms to achieve the same goal of using a different set of absolute keys than the user's currently selected vocal range. The technique remains the same though: The musical training tool allows a lesson to use a range of absolute notes that are different from but still tied to the user's selected vocal range, in order to either a) facilitate pushing the limits of a user's vocal range (hence expanding it through practice) and/or b) limit the absolute notes that will be used in a lesson relative to the lower and upper boundaries of a user's vocal range.

Note that many lessons specify the whole set of absolute keys that humans can produce (e.g. a list that goes from C2-Major to B6-Major, in increments of one semitone at a time, and then back down to C2-Major in decrements of one semitone at a time), and let the musical training tool pick the valid absolute keys out of this set as described above.

Optionally, the developer of a lesson can also specify background audio, which is a set of audio segments (one segment per absolute key that the lesson supports—any of the segments may be omitted if background audio is not desired for that absolute key). Audio segments may be stored in a file, embedded as a resource, streamed from a remote server, or stored/accessed via some other means. Background audio can be used for various purposes and may contain content such as the pre-recorded voice of a vocal teacher (or usually a student of the vocal teacher) performing the lesson for each key, verbal directions from a teacher, instrument sounds (such as the sound of a piano), etc. If instrument sounds are already present in background audio, most lesson designers would likely disable the synthesis of the notes/tracks by the musical training tool in order to prevent the same notes from being played twice. In any case, this is up to the lesson designer to decide; the musical training tool allows the lesson designer to decide what notes, if any, should be synthesized, and what background audio should be played for each absolute key.

When the user presses the play button 595, the musical training tool determines the list of valid absolute keys (as discussed earlier), and then starts playing the synthesized notes (if any) for the first absolute key. If background audio is specified by the lesson, then the musical training tool starts playing the background audio that corresponds to the first valid absolute key, in sync with the synthesized notes/rests. If no track is selected for synthesis, background audio (if any) still starts at the same time it would have started if notes were being synthesized. The musical training tool also starts signal processing for pitch tracking at this point.

When the end of the performance is reached for the current absolute key (i.e. all notes/rests have been played), the musical training tool changes the absolute key of the performance (current absolute key) to the next absolute key in the valid absolute keys list (which in effect causes all relative note to absolute note translations to yield different results, assuming the new absolute key is different than the previous absolute key), performs the actions that were defined earlier in this specification (see the key change list "During each key change: . . . " described in association with FIG. 3), and starts the performance of the next absolute key immediately without any gaps in the synthesis of notes/silences. If background audio is specified, the audio segment for the new absolute key also starts immediately during the key change.

A technique that has been devised to help lower the CPU use during key changes (which can help with animation performance during key changes and/or decrease battery use on mobile platforms) is to disable signal processing during the beginning and end of the performance of each absolute key. The durations this can be done depends on each lesson (and hence can be specified within the lesson); however for most voice lessons, the first measure does not contain any notes to sing and hence signal processing can be disabled for at least half of the first measure (ideally it should be re-enabled at least half a second before the first note that will be sung, if not more, so that the user's pitch is shown in case he/she starts singing the note early). Similarly, most voice lessons end with a silence, and hence signal processing can be disabled before the end of the performance of an absolute key (ideally it should be as close to the end as possible, as the user may continue singing the last note longer than what is dictated). This technique of disabling signal processing at the beginning and during key changes is especially useful on CPU-resource limited platforms such as the iPhone, and can make a big difference in the perceived smoothness of key changes.

The user may stop the lesson at any point in time using the stop button 594, or pause it by using the pause button 595. The play button 595 turns into a pause button when a lesson starts playing, and turns back to a play button when the lesson is paused. The user can then resume a paused lesson using the button 595. Alternative embodiments may use various other techniques to control lesson start/stop/pause operations. For example, because the user is already using a microphone, voice activated operation can be useful not only for starting/stopping lessons, but also for selecting training programs and lessons (for which there is built-in in support in many operating systems and frameworks).

The currently playing note(s) 550 are shown on the piano keyboard 580 (e.g. by giving the corresponding piano buttons a depressed look and putting dots 582 on them). The currently playing note is also indicated on the standard staff 501 by making the note 550 glow. A similar glow effect is also used to indicate the currently playing note 528 on the pitch staff 500. Many different affects can be used, as long as the user can see what note he/she is currently supposed to perform. For example a moving vertical bar that extends across all staffs can also serve the purpose. In addition to the currently playing notes, the musical training tool also highlights any accidentals 540 that apply to the currently playing note, whether the accidental is directly in front of the note head 550, or within the key signature. This is intended as a training aid for teaching sight singing and music theory. Note that the embodiment of the musical training tool shown in this figure uses 3D note heads, which becomes more apparent when the notes are glowing. This is optional and merely a visual design embellishment; other embodiments can use different styles, including basic flat note heads.

While a lesson is playing, and signal processing is started and enabled, two lines provide the user with feedback on his vocal performance (or e.g. violin playing skills). The first of these lines is the instantaneous pitch line 525 that shows the detected fundamental frequency of the user's voice (or the sound of an instrument he/she is playing). Pitch detection is done using a moving window of samples. There is plenty of prior art in this area and many techniques exist, ranging from time domain analysis to frequency domain analysis, to cepstrum-based approaches. Therefore, more detail on implementation of pitch detection is not disclosed here as a person of ordinary skill in audio signal processing can easily come up with various different ways to solve that part of the problem. Note that one thing that is important about the pitch detection method that is chosen is that it should provide octave information (one that is reasonably accurate). In addition to the instantaneous pitch line, the musical training tool also shows a perceived pitch line 520, which is a time-averaged (and/or low pass filtered) version of the instantaneous pitch line 525. Because of delays introduced by the time-averaging/low-pass-filtering algorithm, the perceived pitch line 520 may follow the instantaneous pitch line 525 from a little behind. Note that the term "perceived pitch" in this specification refers to a time-averaged/low-pass-filtered version of instantaneous pitch (even though, in reality any pitch is a "perceived" quality).

The difference between the information provided by a perceived pitch line 520 and an instantaneous pitch line 525 becomes apparent when the user's voice has vibrato or he/she is performing an exercise such as a lip-trills or a tongue-trills which can both cause the instantaneous pitch line to fluctuate wildly around a central pitch that the user is performing. In these cases, the perceived pitch line shows (or attempts to show) the pitch that a human listener would perceive. The time averaging window of the perceived pitch is kept as narrow as possible, but large enough to smooth out any vibrato, which is usually 6-7 cycles per second. So a ⅙ second window, for example, provides acceptable averaging results without introducing too much delay. This can be further tuned as needed depending on the time-averaging/low-pass-filtering algorithm that is used.

The perceived pitch line 520 not only shows the perceived pitch, but also shows—via its color—how closely the perceived pitch matches the target notes that the user is supposed to be performing (singing or playing on an instrument). The color of the perceived pitch line 520 turns to green in sections where the pitch is a good match and to red where it is not. The exact formula presented in the ARGB color space, for one embodiment, is: Alpha (transparency)=0.6, Red=1—Accuracy, Green=Accuracy, Blue=0, where each component is specified in a range of between 0 and 1. However many other color schemes (or other style effects such as varying the thickness of the line) may also be used. Also, the color is interpolated when the slope of the perceived pitch line is very steep (see description of FIG. 6 for more information). Accuracy is a measure of how closely the performance matches the target note and is a value between 0 and 1.

For example, in the case of voice lessons, one good accuracy calculation disregards perfect timing, and checks if the user is able to sustain the note for longer than a predetermined percentage of the note's duration. Using only a percentage of the note's duration also increases the robustness of the accuracy measurement in the presence of occasional pitch measurement errors (e.g. because the wrong octave is detected for a few pitch samples). To achieve this type of an accuracy calculation, a sustain tracker sets a best accuracy for each note to 0 when the perceived pitch line first reaches the beginning of the note. Then, the sustain tracker marks the beginning of a 'sustain' period whenever the perceived pitch error (the vertical distance between the target note and the perceived pitch line measured in semitones or a similar unit) goes under 0.5 semitones (or some other predetermined amount), unless there is already an active sustain period. The sustain tracker marks the end of the 'sustain' period when either the perceived pitch error becomes greater than 0.5, or the perceived pitch line goes past the end of the target note. Whenever the end of a sustain period is marked and the duration of the sustain period from its beginning to end is greater than a predetermined percentage of the note's duration (e.g. 30% of the note's duration), then the tracker calculates the accuracy for the sustain period using the formula:

$$\text{accuracy}_{sustainPeriod} = \frac{\sum_{N_{sp}} (1 - perceivedPitchError)}{N_{sp}}$$

In the equation, $N_{sp}$ is the number of pitch values calculated during the sustain period. The tracker then checks if the calculated accuracy for the sustain period is greater than the best accuracy for the note so far. If it is, then the tracker sets the best accuracy for the note to the accuracy for the sustain period; otherwise, the tracker throws away the accuracy for the sustain period. This way, if the user is able to hit the note for a reasonable duration of it, the accuracy of that hit is taken as the accuracy for the entire duration of note. If the user is able to hit the note again with better accuracy before the note is over (which can happen if the minimum acceptable sustain duration is set to a value smaller than 50%), then the best accuracy for the note is set to the new better accuracy. This approach works very well for voice lessons if/when tempo training is not a goal. An embodiment may use different algorithms for different types of lessons.

The musical training tool keeps track of two sets of average accuracies. Firstly, the average accuracy of each relative note that is defined in the lesson. Secondly, the average accuracy of each absolute note that was performed in the lesson.

The musical training tool may combine either of these sets of accuracies at a higher level, such as at the program level, at the session level, or at a lifetime level. The musical training tool may also store the results at one or more of these levels. For example, if giving historical performance data to the user at the lesson level is a priority, then storing the accuracy data at the lesson level would be appropriate. If however storage space is a priority, storing the accuracy data at the session level may be appropriate. Note that accuracy data for higher levels can be calculated from the lower (more granular) levels (e.g. if lesson-level accuracy data is stored, session level accuracy data can be calculated from this). However, this may not always be desirable if CPU-resources are limited; hence, accuracy data may be stored at multiple levels. In any case, each average accuracy value is stored as a pair of sumOfAccuracyValues and numberOfAccuracyValues (see the description of FIG. 9 for more information), which allows multiple average accuracy values to be combined accurately (by adding sumOfAccuracyValues together for all data pairs that have a non-zero numberOfAccuracyValues, and dividing that by the sum of numberOfAccuracyValues). An explanation regarding the use of tracked/stored average accuracy values or various different purposes is disclosed in other sections of this specification.

The instantaneous pitch line 525 and the perceived pitch line 520 are drawn only for the time durations when a definite pitch is detected. If no pitch can be identified (e.g. because the user is not singing, the user is making an unpitched sound such as the sound "ssss", multiple sound sources are present, etc.), then the instantaneous and perceived pitch lines are not drawn for the corresponding durations on pitch staff 500, hence the pitch lines may have gaps in them (see FIG. 18).

In an alternative embodiment, if no pitch is detected but the energy of the audio is above a certain threshold (i.e. the recorded volume of the audio is high), then the perceived pitch line may be extended into the no-pitch region from neighboring regions, by extrapolating the vertical location of the neighboring regions. Note that this may be done backward in time as well, hence delaying the rendering of the no-pitch region.

Some pitch re-analysis and/or correction of previously calculated pitch values may be done after the initial analysis results are displayed. In this case, the musical training tool may go back and fix the display of the incorrect results. For example, in the case of the instantaneous pitch line 525 and perceived pitch line 520, the previously incorrectly drawn segments of the lines may be removed and the new correct line segments may be drawn in their place after re-analysis results become available. This argument also applies if no discernible pitch was detected in the first pass, but re-analysis provides discernable pitch estimation. A very simple re-analysis technique, which is fast enough to be done in-real time on today's computers, is to correct octave errors when the originally calculated pitch values show a temporary jump to another octave. Such an approach uses not only pitch values that precede the point of interest in time, but also values that come after it.

If desired, the musical training tool can draw an instantaneous pitch line 525 and/or a perceived pitch line 520 for background audio as well (so that, for example, the user can see how a trained singer performs). This can be done by processing the background audio segments live while a lesson is being performed, pre-processing them before a lesson's performance starts, or not processing them at all and instead relying on data supplied with audio each segment. The last option may be desirable/required when the audio segments contain overlapping sounds from multiple sources, or if CPU-resources are limited.

An important feature of the musical training tool is that it gives the user the ability to see his/her progress over the lifetime of his/her practice using the musical training tool (without a way to visualize lifetime progress, many people may not realize that they are actually improving). The musical training tool achieves this in a few ways. The first is by allowing the user to listen to and view his/her past performances, so that he/she can compare them to his/her more recent performances. In the shown embodiment, combo box 596 allows the user to select a past performance, view the instantaneous pitch line 525 and perceived pitch line 520 of the past performance for each absolute key, view the absolute note accuracy color overlay 530 (described in later sections), and listen to an audio recording of the performance. These are achieved by storing the audio of past performances on a permanent storage medium, either locally or remotely—e.g. on a hard disk, on some portable storage, on some cloud service, etc. When the user reviews a past performance, the instantaneous pitch line 525 and the perceived pitch line 520 may either be drawn in sync with the playback (i.e. similar to a live lesson) or drawn at once for each absolute key as soon as the absolute key is displayed (i.e. whenever the absolute key changes, the whole instantaneous pitch line 525 and the whole perceived pitch line 520 for that absolute key are displayed immediately). A horizontally moving vertical line (drawn between the top-line of the first staff 500 and the bottom-line of the last staff 502) shows the current location within the audio that is being played back (the current location within the audio may be visualized via various other techniques as well, such as a moving ball that traces either pitch line, etc.). During playback, the user can use the scrollbar 584 to jump to another absolute key quickly and review how he/she did for that absolute key (the scroll bar 584 shows the relative position of the current absolute key within the list of valid absolute keys). Another technique used to visualize the progress of the user over the lifetime of his/her practice with the musical training tool is the vocal range visualization shape described in conjunction with FIG. 14 and FIG. 15.

FIG. 6

Figure 6:
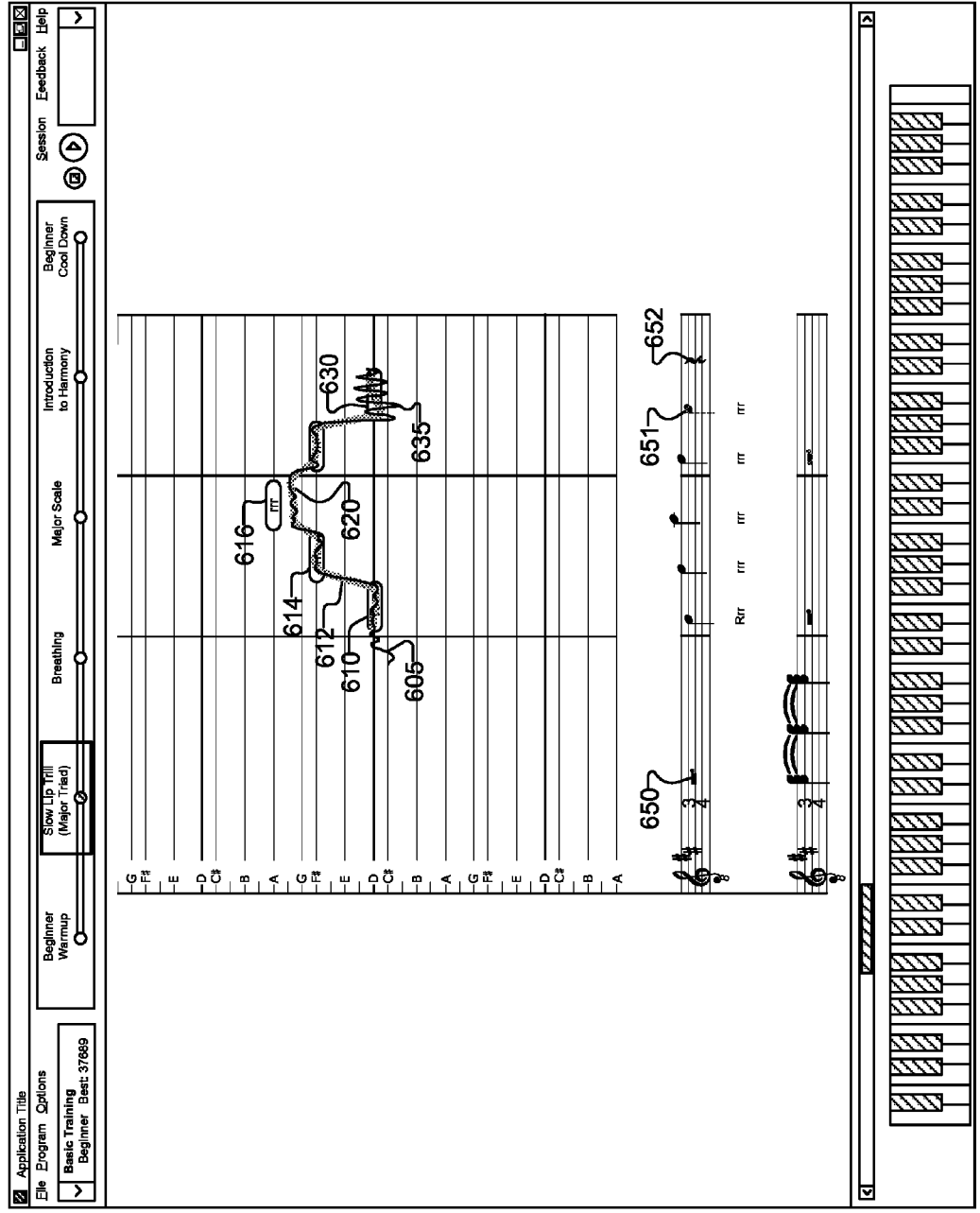

FIG. 6 shows additional features of the music training tool. Perceived pitch line 610, 612, 614, 620 is only drawn at those points where there's a note bubble that corresponds to the same time. In other words, perceived pitch line 610, 612, 614, 620 is not drawn at those points where there's no note bubble to compare it to, such as points that correspond to silences (rests) 650, 652. This can be seen in the initial portion 605 of the instantaneous pitch line before the first note bubble, where a pitch has been detected (and is hence displayed by the instantaneous pitch line segment 605), but the perceived pitch line that corresponds to it has not been drawn. The same effect would have been visible if the user had sung notes after the last note bubble 630, during rest 652. However, alternative embodiments may display the perceived pitch line in these sections as well, preferably with a neutral color, such as gray, that doesn't correspond to a good or a bad match.

In an embodiment, whenever the perceived pitch line experiences a rapid change (visible as a steep slope 612), its color during the steep change is calculated by interpolating between the color that is calculated for the perceived pitch line immediately before the start of the rapid change, and the color that is calculated for it immediately after the end of the rapid change. If the perceived pitch line is drawn live (e.g. during a live performance), an arbitrary color (e.g. the most recently used color, or whatever color is calculated using the technique described earlier in the description of FIG. 5) may be used for the steep slope section temporarily until the pitch line stabilizes (i.e. until its slope isn't steep anymore). Slope can be calculated as the absolute value of the tangent of the line. The reason behind this coloring scheme for steep slopes is that if the user matches two consecutive notes perfectly, it would be confusing to him/her to color the in-between transition area as a bad match, which would happen if the above exception is not made to the perceived pitch line coloring rules.

When there is wide vibrato, which is common for vocal performances (and some instruments), the instantaneous pitch line 635 reflects the rapid changes in pitch. However, the perceived pitch line reflects the pitch that the vibrato is oscillating around (via its vertical location at each point), and —via its color—whether the pitch that the vibrato is oscillating around is a good match for the target note 651 or not. No additional code is required to achieve this effect, other than what is already described in this specification. The reason the perceived pitch line turns towards red just a little bit at the beginning of the note bubble 630 in the figure is because the user missed the note by a small amount at the beginning of the note. This can be seen by the slope of the envelope of the oscillations in section 635 of the instantaneous pitch line.

When the perceived pitch line is a complete miss for the target note bubble, as can be seen in section 620 where the perceived pitch line completely misses note bubble 616, its color turns completely red. As noted before, different embodiments may use different colors, transparency values, line thicknesses, etc.

FIG. 7

Figure 7:
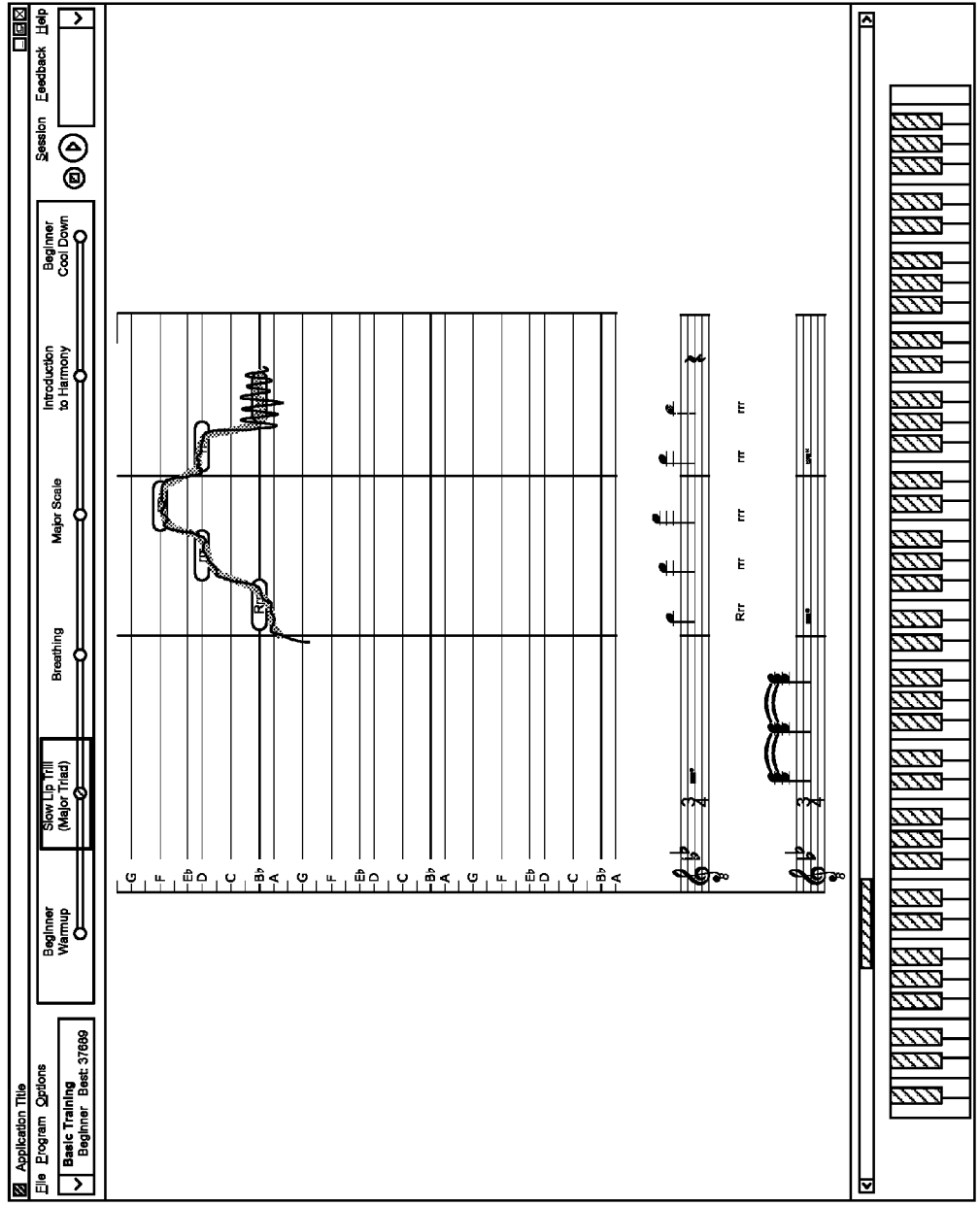

FIG. 7 shows another live capture from a user's voice. As described earlier, different embodiments of the musical training tool may use various different algorithms to calculate perceived pitch, using some form of averaging and/or low pass filtering on instantaneous pitch.

FIG. 8

Figure 8:
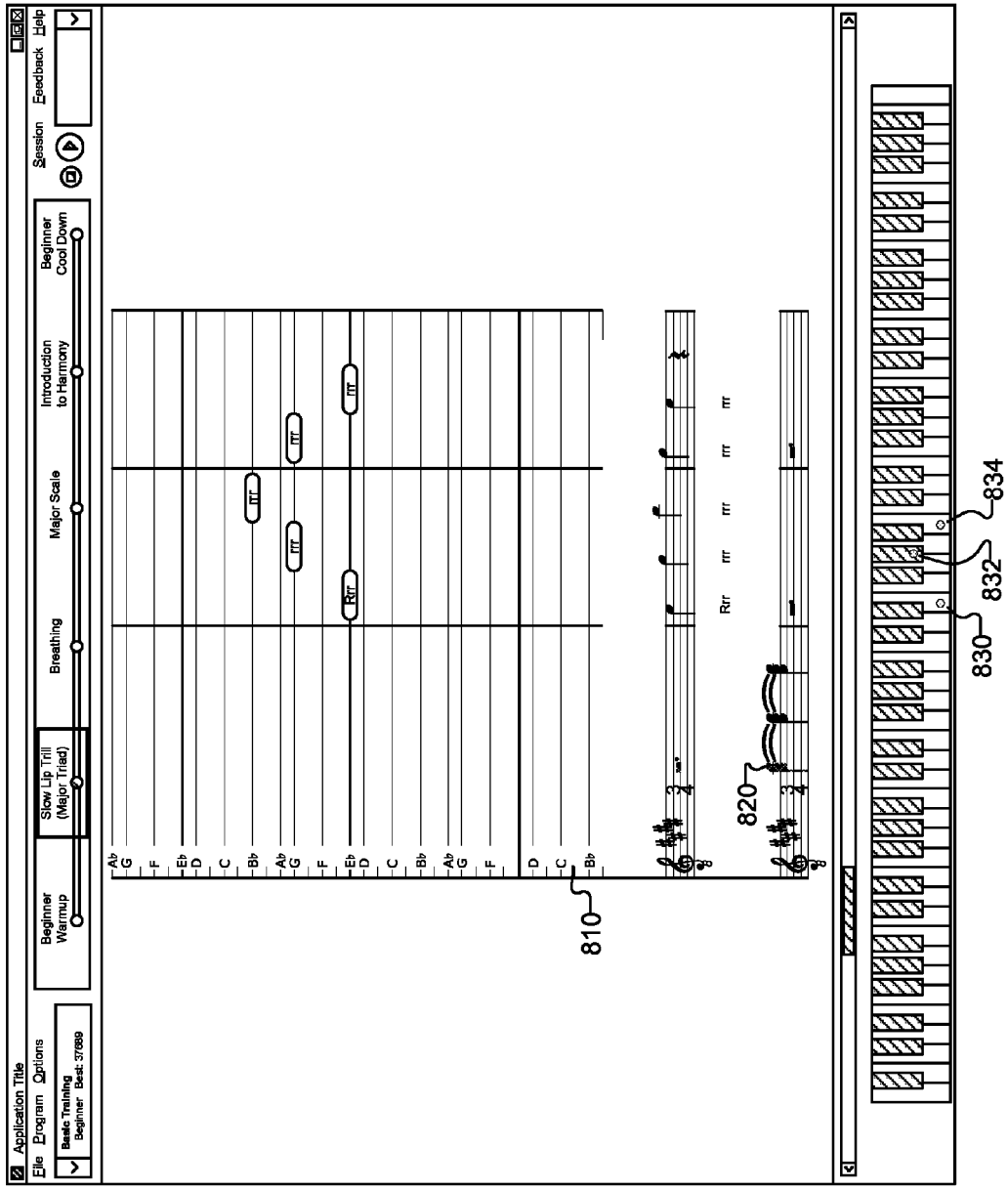

FIG. 8 is a display image immediately after a key change. The note names 810 from the previous absolute key that have almost completed their fading out are still visible. Everything else (notes, note bubbles, etc.) has completely shifted into its new location and the first chord 820 has started playing already. The piano keyboard also shows the current notes that are playing via the depressed keys 820, 832, and 834. The actual visual design may vary in different embodiments. Other embodiments may simply change the color of the piano keys instead of the depressed look, or use any other visualization that shows that the note is playing. Yet other embodiments may not show the piano keyboard at all (e.g. to save screen space or for other purposes) or display it elsewhere on the screen and/or in a different orientation. The piano keyboard may also be replaced by some other instrument visualization such as a guitar fretboard, or by multiple instrument visualizations (such as both a piano keyboard and a guitar fretboard stacked on top of each other).

FIG. 9

During a lesson, the absolute note accuracy color overlay 900 shows how well the user has been hitting each absolute note 902. The color overlay 900 is updated live whenever the end of a note is reached during a lesson's performance. The color for each absolute note is calculated as follows (in the ARGB color space): Alpha(transparency)=0.6, Red=1−AverageAccuracy$_{absoluteNote}$, Green=AverageAccuracy$_{absoluteNote}$, Blue=0, where each component is specified in a range of between 0 and 1. However, other color schemes can also be used. A smooth transition between the colors of the different absolute notes is used in some embodiments, though this is optional. Other embodiments may use various different designs to display the average accuracy that the user achieved in hitting each absolute note. For example, they may place the color overlay 900 to the left or right of the note names 902 (instead of placing it on top of them as in the figure), use text (e.g. numbers, percentages), a progress-bar like rectangle for each absolute note where the progress-bar's "progress" would be the average accuracy of the user for that absolute note, etc. The average accuracy for each note may also be displayed similarly over a piano keyboard 990 or the visual representation of some other instrument (such as a violin neck or guitar fretboard) using a color overlay, text, a progress-bar like rectangle, etc.

In the above paragraph, average accuracy is calculated as follows:

$$AverageAccuracy_{absoluteNote} = \frac{\sum_{N_a} bestAccuracyForAbsoluteNote}{N_a},$$

where $N_a$ is the number of times the user has been expected to perform the absolute note so far, and bestAccuracyForAbsoluteNote is the best accuracy that the user achieved when hitting the absolute note each time he/she was expected to perform it. "Best accuracy" is described in the description of FIG. 5. Note that the user may be expected to perform the same absolute note while performing various different relative notes under different absolute keys. For example a C4-Major+scale degree 2 (using the 1-based Arabic numeral numbering system for scale degrees) is equal to a D4-Major+scale degree 1 when it comes to their absolute note equivalents.

When a lesson ends, the lyrics that are displayed in, below, or above any of the staffs (for example the ones inside the note bubbles 910, 920, 930, 940, 950 in this figure) may be replaced with the average accuracy information for relative note instances. To do this, the portion of the lyrics for each relative note instance is replaced with the accuracy that the user achieved when hitting that relative note instance, regardless of the absolute keys that the relative note instance was performed under. For the purposes of this discussion, each note definition within a lesson is referred to as a relative note instance (for example, note bubble 910, note bubble 920, note bubble 930, note bubble 940, and note bubble 950 all correspond to different relative note instances). The average accuracy for each relative note instance can be calculated using the following formula:

$$AverageAccuracy_{relativeNoteInstance} = \frac{\sum_{N_r} bestAccuracyForRelativeNoteInstance}{N_r},$$

where $N_r$ is the number of times the user has been expected to perform the relative note instance so far, and bestAccuracyForRelativeNoteInstance is the best accuracy that the user achieved when hitting the relative note each time it was expected to be performed. "Best accuracy" is described in the description of FIG. 5 earlier in this document.

Figure 9:
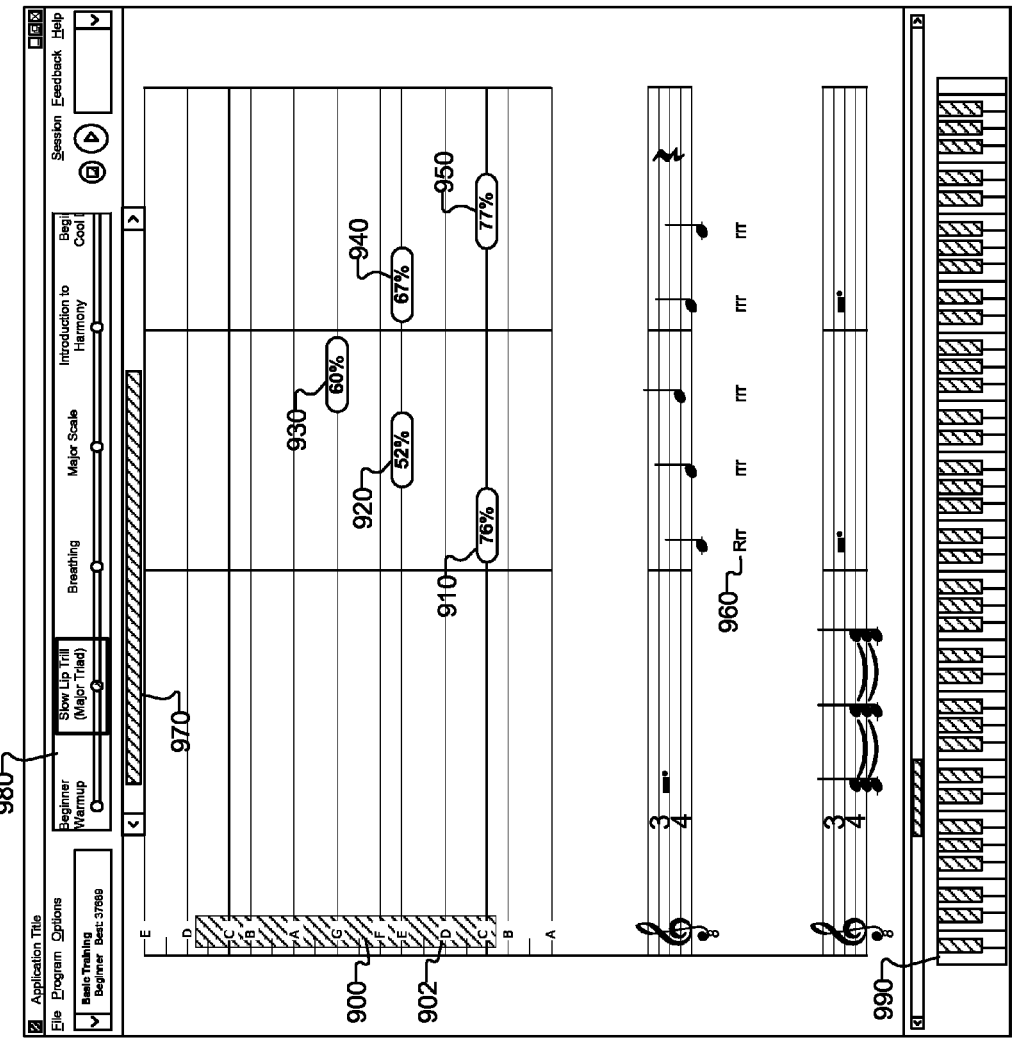

Although not shown in FIG. 9, relative note accuracies can be shown by replacing any/all of the lyrics (for example the standard staff lyrics 960 can also be replaced with the numbers 76%, 52%, 60%, 67%, and 77% for the performance shown in the figure). Instead of replacing the lyrics, the numbers can be presented adjacent to (e.g. above or below) the note bubbles and/or lyrics. Instead of using numbers to show percentages, different visualizations may also be used, such as a change of color, or progress-bar-like elements (one for each relative note instance) below the lyrics 960. As another example, each note bubble 910, 920, 930, 940, 950 may be filled starting from the left, to an amount that reflects the average accuracy of the corresponding relative note instance (e.g. if the average accuracy for a relative note instance is 25%, then the first quarter of the note bubble could be filled to show this visually). All of these visual variations achieve the same purpose of letting the user know how well he/she did in hitting each relative note instance.

The reason each relative note instance is tracked separately is because people usually perform differently for the same relative note depending on the preceding (and sometimes even the following) relative notes. For example, performing note 920 after note 910 can be a very different task than performing note 940 after note 930, even though both notes (note 920 and note 940) have the same relative note value (but correspond to different relative note instances). A user may perform differently even for the same transition (e.g. from a tonic to a dominant), depending on the location of the transition on the horizontal (time) axis (e.g. because he/she may be running out of breath during singing). That is why each relative note instance is tracked separately for maximum flexibility.

An embodiment of the musical training tool may also provide the user with additional feedback (not shown in the figure) on how well he/she has performed for the various relative note transitions, such as his/her average accuracy when transitioning from the tonic (scale degree 1) to the dominant (scale degree 5) in a major scale. When presented at the end of a lesson, this information includes just the transitions that were present in the lesson. When presented outside of a lesson (i.e. globally), the information includes all (or a subset) of the transitions that are covered by all of the lessons that are made available in the musical training tool. The musical training tool can keep a record of the user's past performances for either case (lesson-specific or global), and display his/her progress over time for each transition (which it can do via known statistical visualization methods, such as a line graph).

The visual design of the embodiment that is shown in FIG. 9 automatically displays a scrollbar 970 that normally hides under box 980. The scrollbar 970 slides down when the mouse cursor is anywhere above box 980 and there are more elements (lessons) than fit the width of the box. The scrollbar 970 hides when the mouse cursor leaves the area covered by box 970 and the scrollbar 970 itself. A similar technique can also be used for vertically oriented scrollbars. If the code is executed on a touch-oriented device (such as a tablet computer), then the scrollbar may be disabled, as the user can slide the scrollbar with his/her finger instead.

FIG. 10

Figure 10:
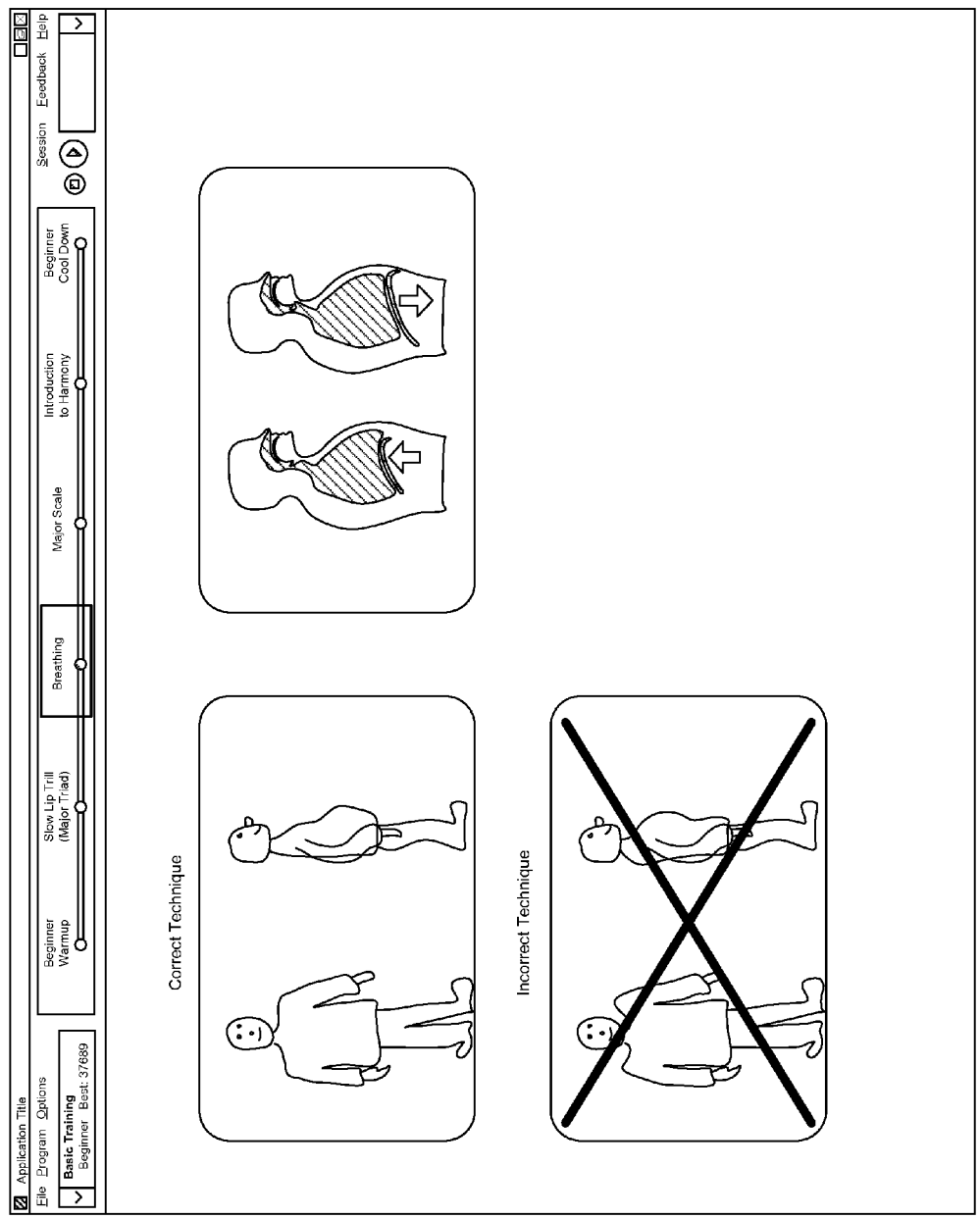
FIG. 10 shows a prototype of a lesson that utilizes elements other than staffs.

While the specification thus far has focused on lessons that utilize staffs, the musical training tool is built to support any type of lesson (which, in this embodiment, is achieved through the use of a separate XAML file with its own .NET/C# backing code for each lesson). This allows a lesson to display additional information before it displays a staff-based exercise, or to provide a different form of exercise altogether (i.e. one that doesn't utilize musical staffs). FIG. 10 shows a screen that demonstrates the proper way to breathe during singing via some animated drawings or videos with optional audio. The actual elements/animations/videos that are presented, their locations on the screen, and any user interaction with those elements are determined by the designer of the lesson.

FIG. 11

Figure 11:
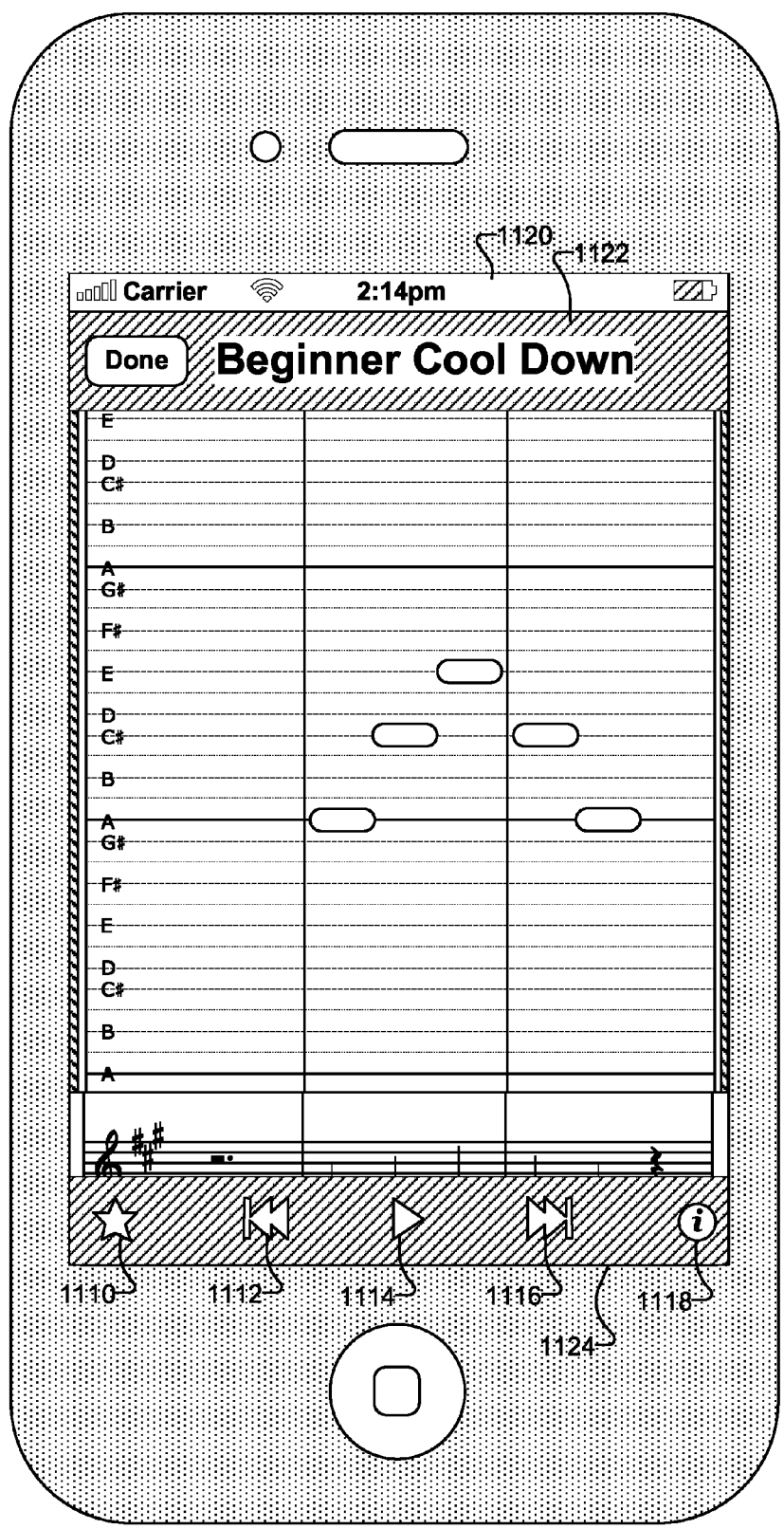
FIG. 11 depicts a smartphone display embodiment of the musical training tool in portrait orientation.
Figure 12:
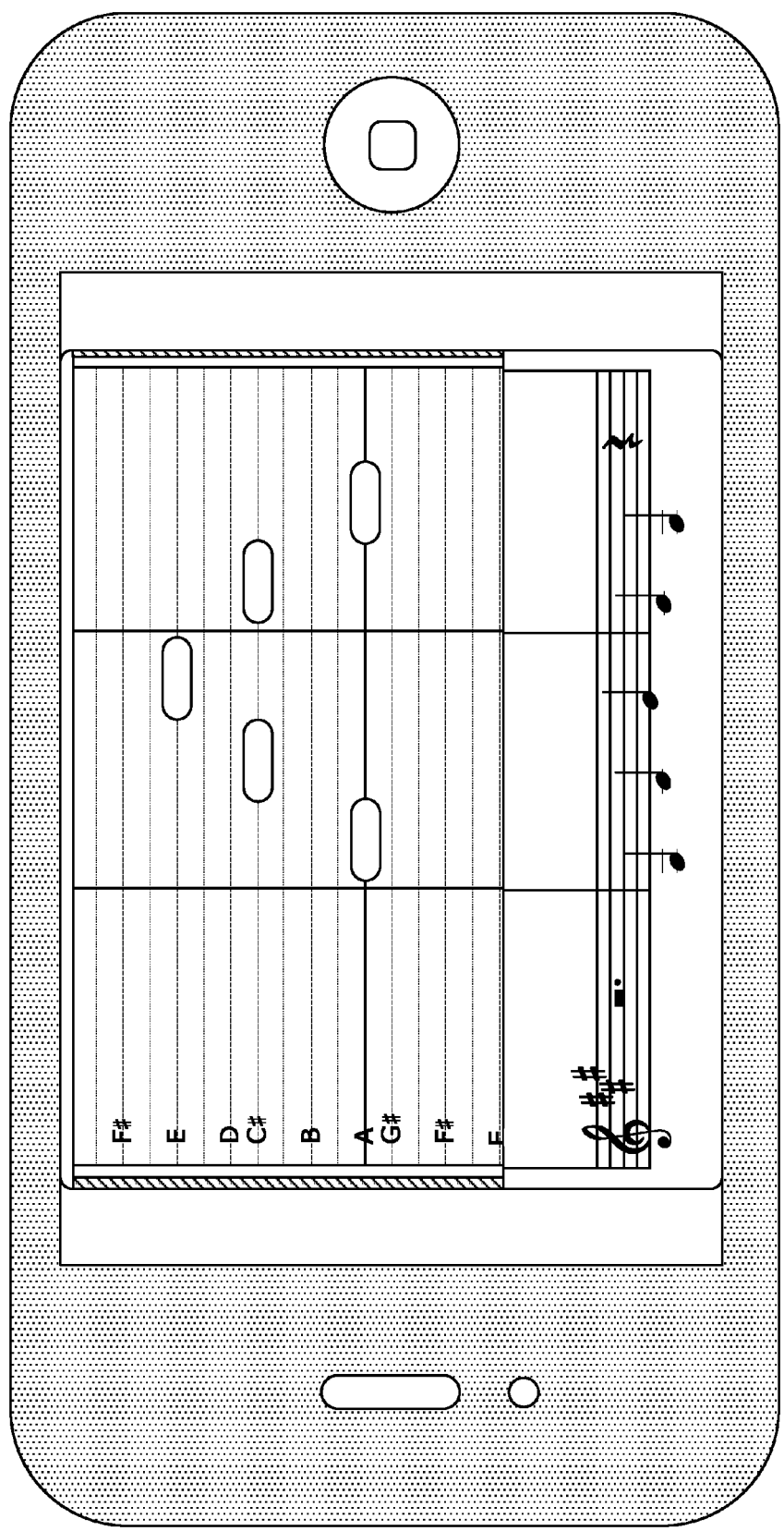
FIG. 12 depicts a smartphone display embodiment of the musical training tool in landscape orientation.

FIG. 11 shows a working embodiment of the musical training tool that consists of an iPhone4, and an Objective-C based implementation of the musical training tool's software components running on the iPhone4. Many features of the iPhone4-based musical training tool are similar to those of the WPF-based embodiment; therefore, related discussion won't be repeated. Notable differences are the smaller form factor, which makes it easier for a user to carry the musical training tool with him/her, and some necessary design changes to make the musical training tool software work with the smaller form factor and limited resources.

Figure 20:
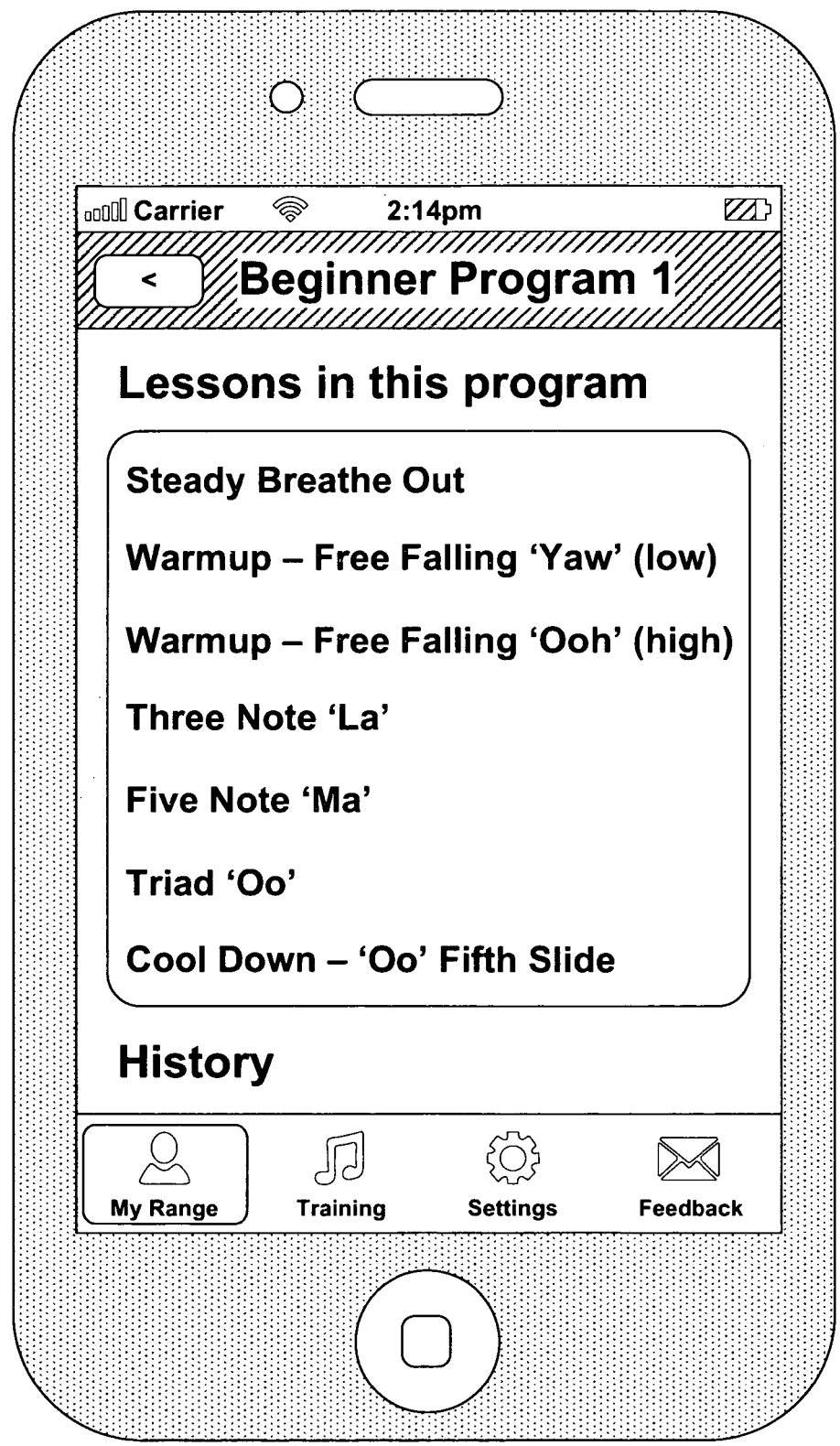
FIG. 20 shows a training program page from a smartphone embodiment of the musical training tool.
Figure 21:
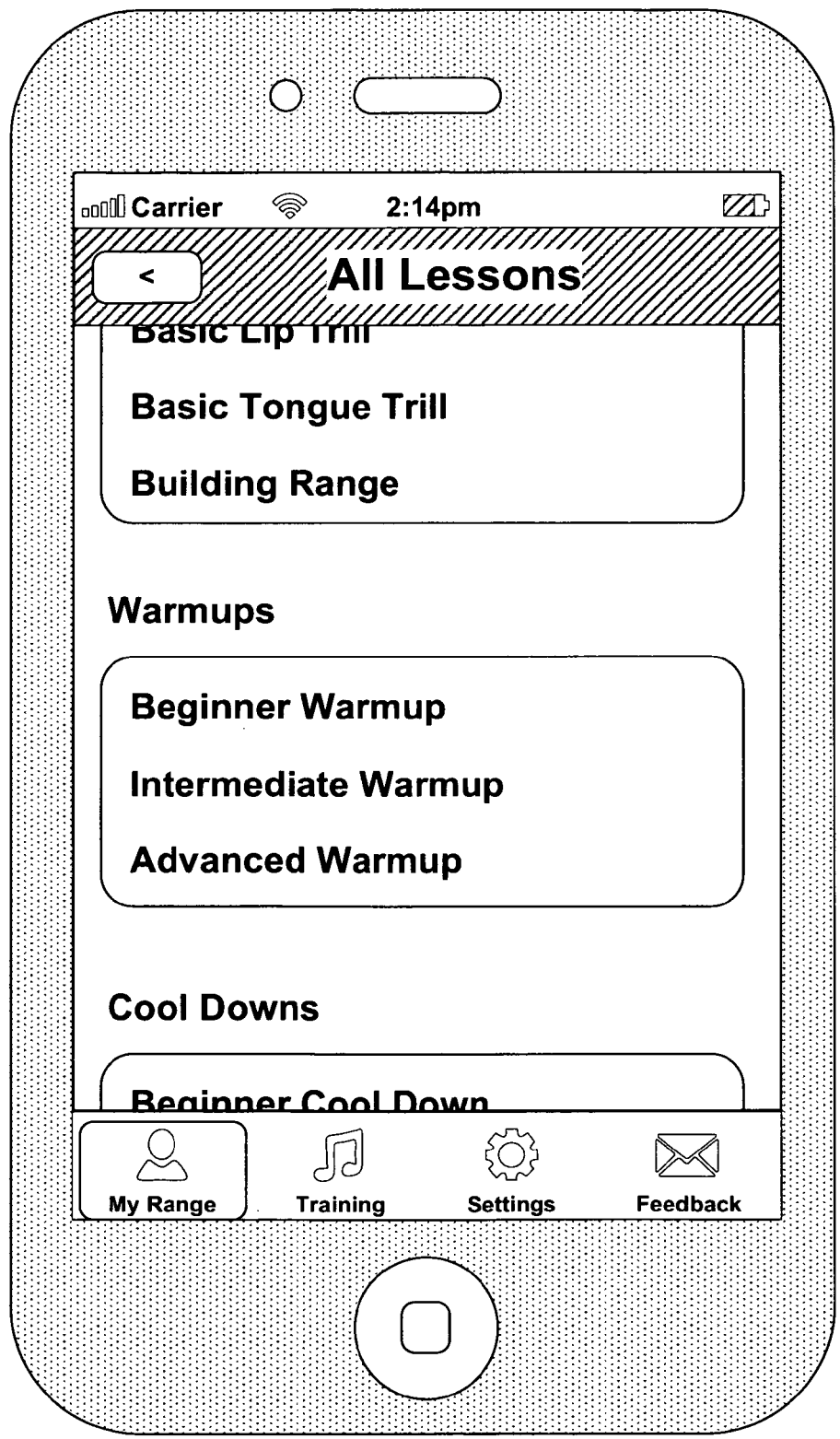
FIG. 21 shows a list of all lessons from a smartphone embodiment of the musical training tool.

After the user selects a lesson (directly from a list of all lessons, such as the one shown in FIG. 21, from within a training program, such as the one shown in FIG. 20, or from some other list), the musical training tool displays the lesson page (such as the one in FIG. 11) for the selected lesson.

The display image in FIG. 11 shows a lesson page with a standard staff and a pitch staff for a voice lesson. The user can start the lesson by pressing the play button 1114 at the bottom. Once pressed, the lesson starts playing similar to the WPF-version, and the musical training tool starts playing the notes via a set of pre-sampled piano sounds and starts tracking the user's vocal performance (e.g. pitch accuracy, instantaneous pitch line, perceived pitch line, etc.).

Figure 22:
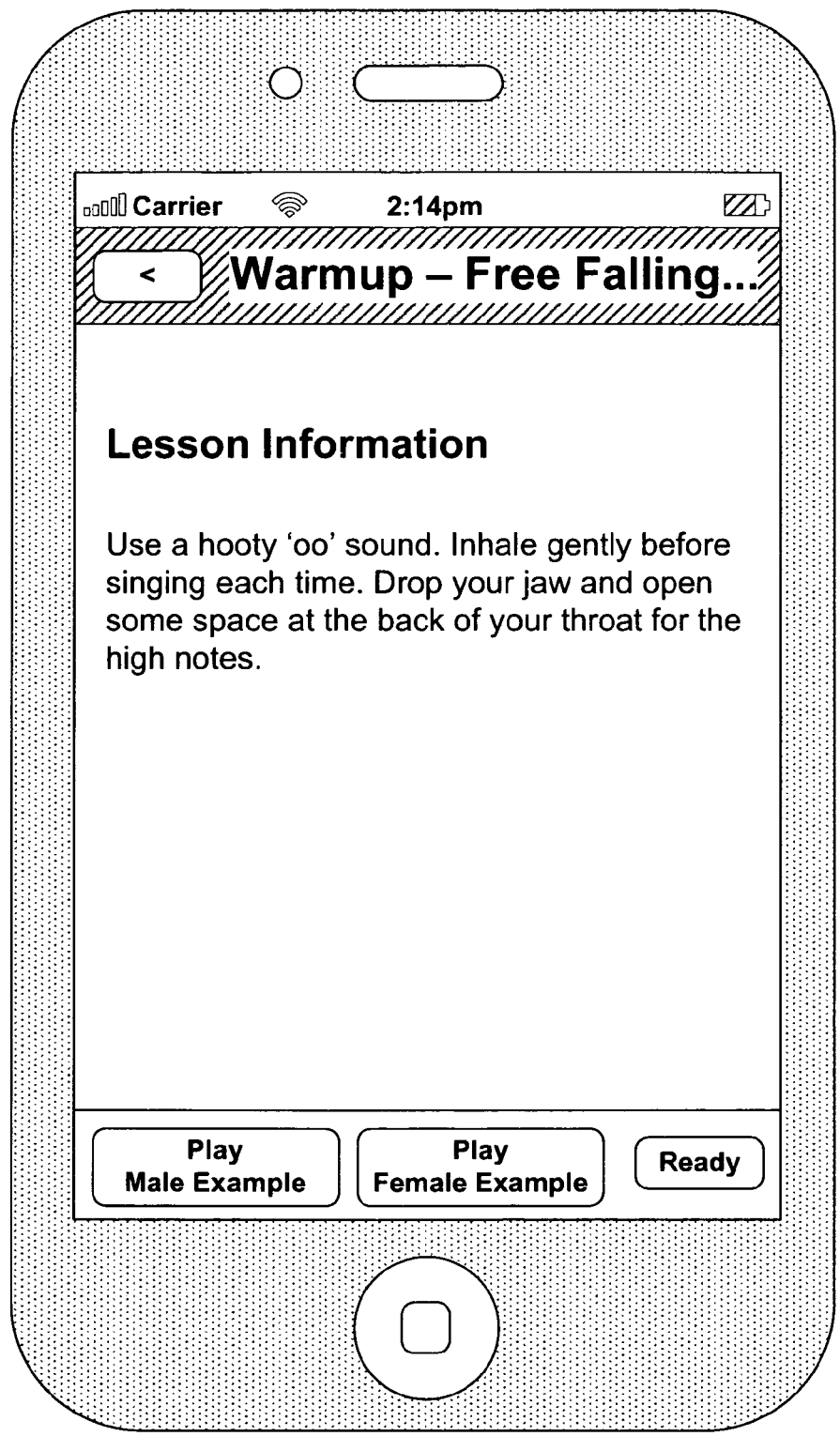
FIG. 22 shows a lesson information page from a smartphone embodiment of the musical training tool.

The user can move to the next lesson in the current training program by tapping the next button 1116, or to the previous lesson in the current training program by tapping the previous button 1112. The user can tap the favorite toggle button 1110 to add/remove the lesson to/from a list of favorites. The user can tap the information button 1118 to get textual information about the lesson and gain access to male and female voice examples for the lesson (i.e. pre-recordings of other people performing the lesson under the supervision of the lesson's designer). The information page that opens up when button 1118 is tapped is shown in FIG. 22.

The status bar 1120, the title bar 1122 (i.e. the bar that contains the text "Beginner Cool Down" in the screenshot), and the bottom bar 1124 (i.e. the bar that contains the various lesson control buttons 1110, 1112, 1114, 1116, 1118) all automatically hide when a lesson starts playing. The user can bring back these bars 1120, 1122, 1124 temporarily by tapping the screen. The automatic hiding of the bars 1120, 1122, 1124 allows the full screen space to be available for the staffs and/or other lesson elements.

FIG. 12

The musical training tool can be used in any orientation of the mobile device, and automatically utilizes the available screen space as much as possible. All features of the software are identical in any orientation, except for the layout of the staffs.

In the following discussion, the term pre-render refers to an arbitrary unit of distance. Therefore, pre-render height is a distance measured in these arbitrary units, and pre-render width is also a distance measured in the same arbitrary units.

The layout of the staffs is optimized as follows:

Each standard staff is given a fixed amount of pre-render height (the lesson's definition puts a minimum limit on the pre-render height that should be used for each standard staff and lets the musical training tool software expand this pre-render height to encapsulate all notes within the user's range if needed).

Each pitch staff is given a fixed amount of pre-render height as determined by the lesson.

The pre-render width for all staffs (standard staffs and pitch staffs) is determined by laying out the notes (as well as the rests, bar-lines, the clef, the key signature, additional margins, etc) on all of the staffs in sync with each other. Only one pre-render width is calculated at the end of this. This is because the time-lines (horizontal axes) of all staffs are kept in sync.

Once the pre-render size of the rectangle that contains all of the staffs is determined (a visible or invisible rectangle whose width is equal to the pre-render width of all staffs, and whose height is equal to the sum of the pre-render heights of all staffs), a rendering scale factor is determined such that the rectangle that contains all of the staffs fills as much of the screen as possible without being cropped. This means that either the top and bottom edges or the left and right edges of this rectangle will touch the boundaries of the available screen space. After the rendering scale factor is calculated, if there is any available vertical space left (which may happen if the left and right edges of the rectangle touch the edges of the screen as seen in FIG. 11), then this remaining space is distributed evenly across all pitch staffs. After the rendering scale factor is determined and any readjustment to the pitch staff heights is made as described, the actual rendering takes place (using the rendering scale factor to convert from pre-render units to actual screen units) and all the staffs and the elements they contain are drawn to the screen as seen. If the device is rotated, the staffs are rotated accordingly, while a new layout process takes place using the same rules described above.

The pitch staff in the iPhone4 version is placed into a vertical scrollbar that can be scrolled by the user. When the user doesn't scroll the pitch bar manually (and also when a lesson first starts), the musical training tool automatically ensures that all note bubbles are within the visible area of the pitch staff (if possible) and keeps automatically scrolling the pitch staff as needed during key changes.

Depending on the definition of each lesson, as well as user preferences, more staffs may be present, some staff types may not be present at all (e.g. no pitch staff, or no standard staff), and/or an instrument similar to the WPF-version's piano keyboard may be displayed. Some lessons may not display staffs at all and instead present the user with animations, video, audio, and/or interactive user elements to facilitate further training of the user.

FIG. 13

Figure 13:
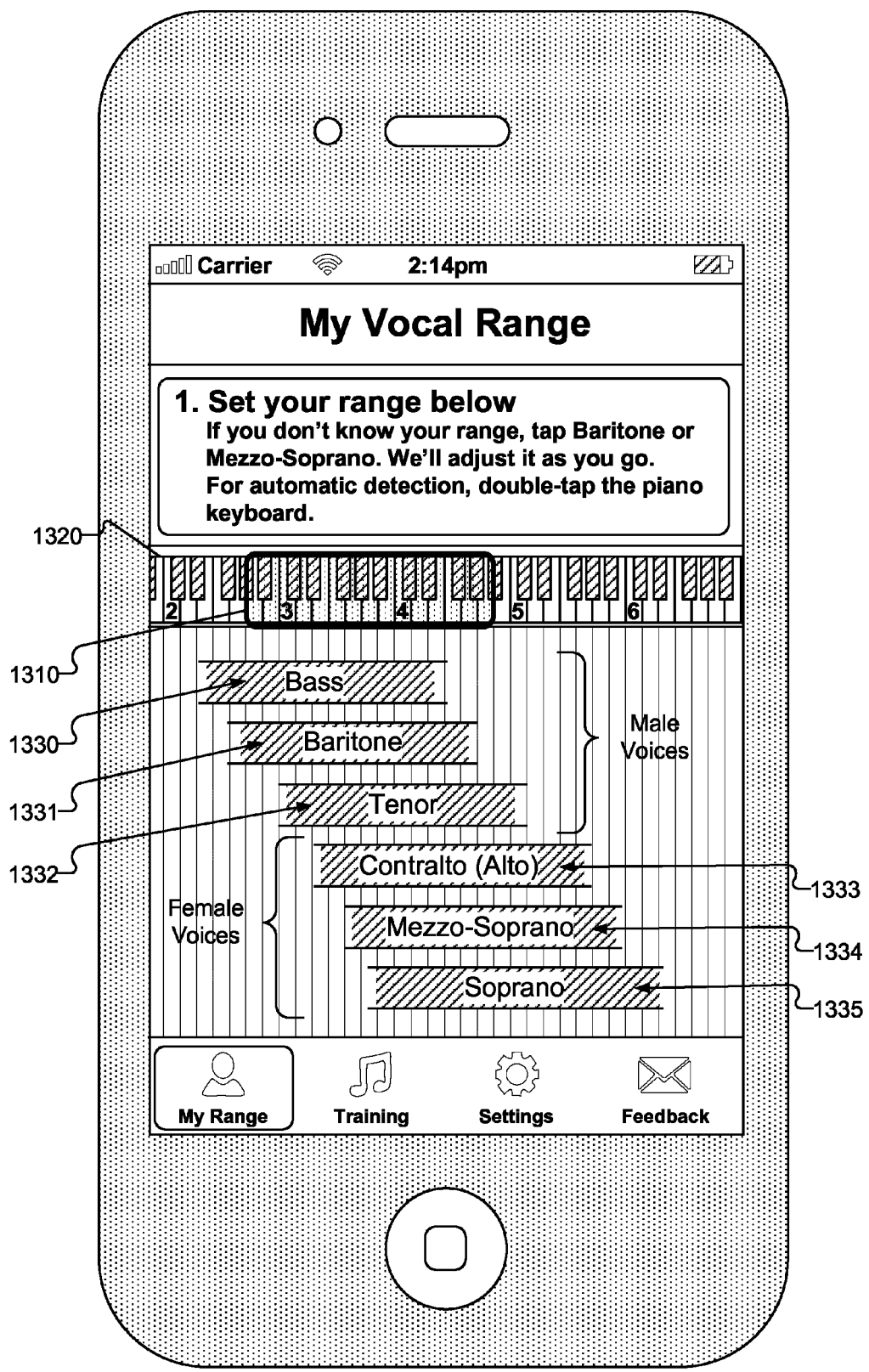
FIG. 13 shows the vocal range selection screen of a smartphone embodiment of the musical training tool.

FIG. 13 shows the main screen of a smartphone embodiment of the musical training tool. This screen allows the user to set his/her vocal range. The bubble 1310 over the piano keyboard 1320 represents the user's currently selected vocal range. The user's currently selected vocal range may be automatically calculated based on previous performances, or manually set by the user as described below.

The numbers "2", "3", . . . "6" that are visible on the piano keyboard 1320 show the beginning (from left to right) of each octave using a conventional octave numbering system. Each octave starts on the note C (also known as Do in the fixed-Do system).

The user can tap on one of the predefined vocal range rectangles 1330, 1331, 1332, 1333, 1334, 1335 (labeled "Bass", "Baritone", "Tenor", "Contralto (Alto)", "Mezzo-Soprano", and "Soprano" in the figure) to set his/her selected vocal range, in which case the bubble 1310 that is displayed over the piano keyboard 1320 is resized to match the tapped predefined vocal range. Alternatively the user can use the bubble 1310 that is displayed on the piano keyboard 1320 to adjust his/her selected vocal range.

The user can use a single finger to move and adjust the size of the bubble 1310 that is displayed over the piano keyboard 1320. Dragging the center of the bubble 1310 moves it left or right horizontally without changing the number of piano keys (semitones) it covers; the physical width of the bubble 1310 in screen pixels may change to ensure that it is always aligned with the edges of white and/or black piano keys. The user may drag either the left or the right edge of the bubble 1310 to resize it on the corresponding side. The user may also drag the empty areas to the left or to the right of the bubble 1310 for the same effect as dragging the edge of the bubble 1310. The edges of the bubble 1310 are aligned with the edges of piano keys during resizing operations as well.

The user can also use two fingers to move and adjust the size of the bubble 1310 that is displayed over the piano keyboard 1320. The operation is similar to the single finger case, except a pinching motion of the two fingers can be used to expand or reduce the size of the bubble 1310 (and hence expand or reduce the user's selected vocal range).

In some embodiments, the initial vocal range of the user may be set automatically after a range detection lesson. A range detection lesson is one where the user is asked to sing a range of notes and the software checks what notes the user is able to sustain (where the best accuracy that is calculated for the note—described earlier in this document—is greater than 0). The range detection lesson may not necessarily be formatted/displayed as a lesson and may instead be integrated into the same screen that displays the user's selected range (i.e. into the screen shown in this FIG. 13). This is the approach used in one embodiment, where the user can double-tap (double-click) the piano keyboard 1320 or the bubble 1310 over it at any time to initiate automatic range detection. When the user does this, the bubble 1310, which is normally green in the shown embodiment, starts glowing between red and blue colors and the user is asked to say 'ahhh' first in their normal voice, and then at the lowest and highest pitches they can sing without straining their voice. The first time the musical training tool detects a sustained note after automatic range detection instantiated each time, it moves the user's selected range to the detected note. For every subsequent note that the user sustains, the tool expands the selected range to include the new note unless the note is already included within the selected range. The user ends automatic range detection by tapping on the piano keyboard 1320 or the bubble 1310, or by exiting the range selection screen of the musical training tool.

After the initial vocal range is set and the user performs some lessons, the software may automatically update (expand, reduce, or move) the user's selected vocal range using the procedures described in other sections of this document. The user may disable automatic updates to his/her selected vocal range through the Settings tab.

The rectangular area between the piano keyboard and the tab buttons at the bottom (the area that contains the predefined vocal range rectangles 1330, 1331, 1332, 1333, 1334, 1335) is a scroll view that supports vertical scrolling in a unique way. The top portion of its contents (which is the portion that is displayed in this figure) uses "paging" (as defined by Apple's UIScrollView control) which means that the top portion locks into place whenever it is scrolled into view. This ensures that it will either be completely visible or completely out of view. This part is identical to Apple's paging design. The difference in the present implementation is that the bottom contents of the scroll view do not use paging, hence can be freely panned by the user (vertically in this case). Only the top portion is locked into place when it comes into view; the bottom portion is not (the bottom portion contents can be seen in FIG. 14). This type of a mixture of paging/non-paging scroll view can be used for many different purposes, and may include multiple locking/non-locking (i.e. paging/non-paging) sections distributed along a vertical axis, a horizontal axis, two axes, or more dimensions when more dimensions are available (e.g. on a 3D display). Such a scroll view can be used for various other purposes, including many that are not covered here.

The background of the rectangular area between the piano keyboard and the tab buttons at the bottom contains prominent vertical lines to show octave divisions, and thin lines to mark the boundaries of white piano keys (i.e. degrees of the C-Major scale for each octave).

FIG. 14

It is important for a musical training tool to provide the user with a history of his/her progress. Without this, many people may not realize that they are actually improving and hence may get discouraged. Presenting the user with his/her progress in a clear, concise manner (as opposed to, for example, a table of numbers) can encourage the user to do better each time and to put in more time into his/her practices.

Figure 14:
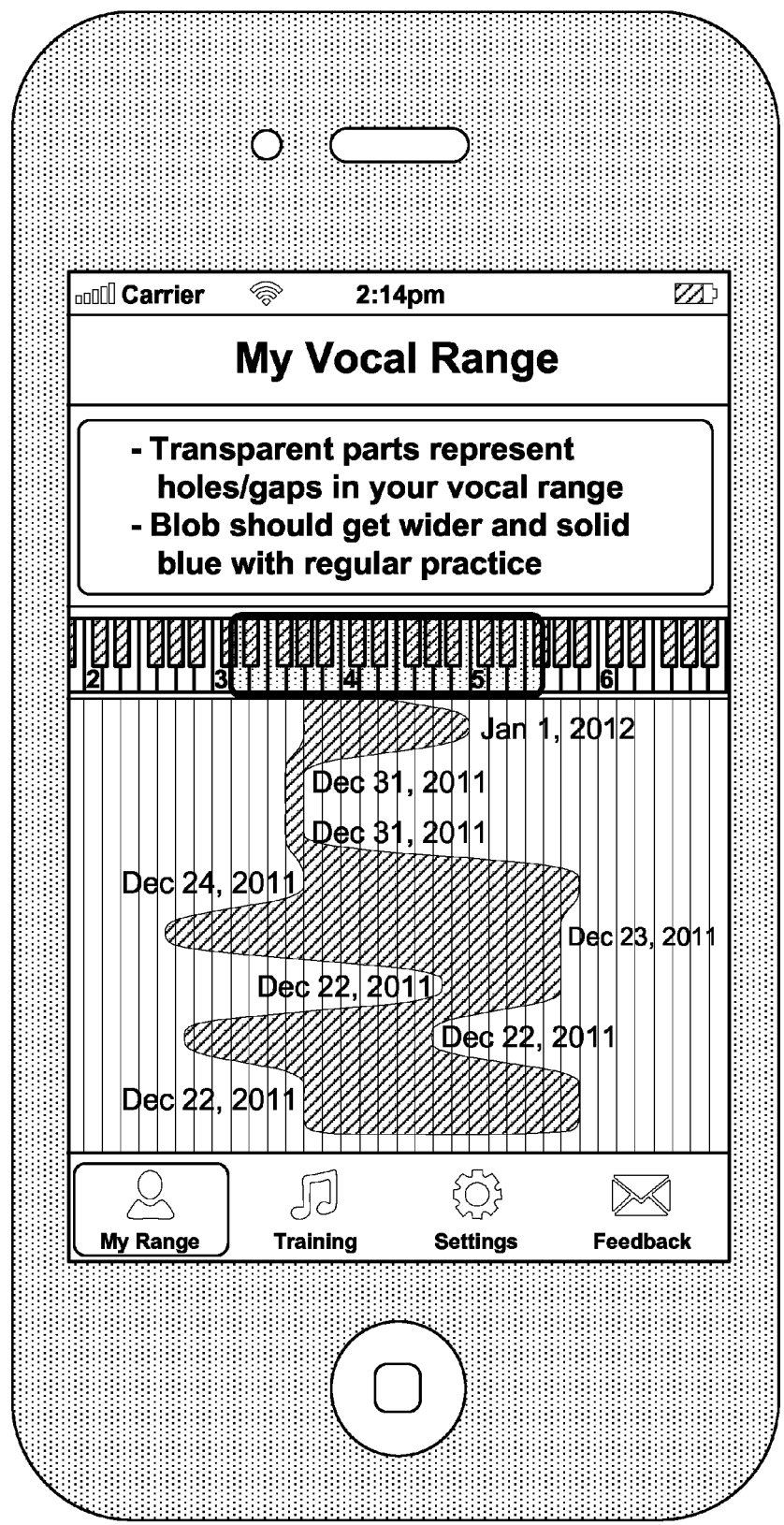
FIG. 14 shows the vocal range history screen of a smartphone embodiment of the musical training tool.

The blob 1420 in FIG. 14 is a shape that can extend for multiple pages (FIG. 14 shows the bottom portion of such a shape). The user can freely pan this shape up and down; any date text that is displayed on the sides of the shape also move with the shape (which is achieved using the scroll view design that is described in the description of FIG. 13). At the very top, the predefined vocal range rectangles (which are shown in FIG. 13) are stacked above blob 1420 in an area that supports paging as described in the description of FIG. 13.

The blob 1420 is drawn as follows:

Each past session is given a row (vertical amount of space) in blob 1420. The height of each row is set as follows:
  The available vertical height (maximum allowed height for the blob) is distributed evenly among all rows, except the selected row is given a larger height.
  If no row is selected or row selection is not supported, then the row that corresponds to the current session (or the most recent session if no current session exists) is treated as if it is selected (i.e. it is given a height that is larger than all other rows). This effect can be seen in FIG. 15. FIG. 14 does not show the current session row (the total height of the blob 1420 was about twice as high as the visible portion that shows the bottom of the blob at the time the screenshot was taken).
  If the height of a non-selected row exceeds a maximum value of $H_{max}$, then the row's height is set to $H_{max}$.
  If the height of a selected row exceeds a maximum value of $H_{selectedMax}$, then the row's height is set to $H_{selectedMax}$.
  If the height of any row drops below a minimum value of $H_{min}$, then the musical training tool may consolidate sessions automatically (described later in this section).
$H_{max}$, $H_{selectedMax}$, and $H_{min}$ are arbitrary values decided by the developer of the musical training tool. If desired, the height of a selected row may be the same as all other rows in an alternative embodiment.
The lowest absolute note and the highest absolute note that the user was able to hit during each session determines the location of the left and right edges of the corresponding row, such that those two absolute notes are completely included within the row (along with all the other absolute notes that reside between them, regardless of whether the user was able to hit the in-between notes or not).
A horizontal color gradient is used for each row, where each absolute note that resides between the left and right edges of the row is assigned a gradient stop and the color of each gradient stop is determined according to the average accuracy that was achieved for the corresponding absolute note during the entire session. The formula use for this in the ARGB color space is: Alpha=Accuracy, Red=0, Green=0, Blue=1. Using this formula, a decrease in the average accuracy of an absolute note results in a more transparent gradient stop for the absolute note, creating a hole in the row in that section, which lets the user know that he/she wasn't able to hit that note very well. The gradient approach shows the user how well he/she was able to hit each note between the extremities of his/her vocal range.

The time of each session is displayed adjacent to the row on either side. The preferred side is the side that has more available space. The time of each session may be displayed as a date, date and time, a relative time specification (e.g. "current session", "yesterday", "last week", "two months ago"), or a wider time duration (e.g. "March", "April", etc. or "2011", "2012", etc.). Some embodiments may display the time for only a subset of sessions, or none of them at all.

When the height of the blob 1420 exceeds a predetermined height (e.g. twice the height of the viewport in which it is displayed), the musical training tool may consolidate some sessions (for the purposes of displaying blob 1420) to make it easier for the user to visualize his/her entire progress without having to scroll the view too much. This can be done by consolidating (combining) the average scores of each session within a consolidation period into a single session for the purposes of displaying blob 1420. As the number of sessions gets large, sessions may be consolidated into absolute time periods such as "March 2011", "April 2011", or "2010", "2011", etc.

The edges of blob 1420 are smoothly connected to each other using Bezier curves as seen in FIG. 14. Other curve styles may be used or the transitions may be sharp (resulting in a perfectly rectangular area for each row). The latter approach is used in the current implementation of the WPF-version of the musical training tool, with a pulsating red background for the selected row (explained below).

If desired, the area that resides under the blob 1420 may contain an animated color (e.g. a color that pulsates between solid red and completely transparent red) in order to make the holes more prominent. This may be done for the entire shape, or if desired, for an individual row only (e.g. the current session only or the selected session only).

The color/transparency transition from one row to another may be smooth (as shown in FIG. 14), or sharp.

The session data that was used for the screen shot captured in FIG. 14 is for demonstrational purposes; actual user sessions would likely show less variation, and get wider towards the top assuming the user wasn't previously trained and keeps up regular practice.

The rows for the sessions (or for consolidated sessions) are sorted by time. The recommended order is to have the most recent sessions in the direction that contains the piano keyboard.

Instead of accuracy, the blob 1420 may show other performance data (e.g. breathiness, volume/energy control, resonance, amount of vibrato, etc.), and this may be a user-selectable feature. Although not recommended, some embodiments may use each axis of a chosen color space (e.g. ARGB color space) to reflect a different parameter, so that multiple parameters (performance data that corresponds to different features) are visualized using a single blob 1420.

The blob 1420 may support a means to select a row, and when a row is selected, a way to delete all session data associated with the selected row. The current WPF-version of the musical training tool software uses a ListBox and ListBoxItems with custom styles, where each ListBoxItem instance represents a row. In the WPF-version a selected row gets taller to give it a vertically magnified look, and displays a little 'x' shaped button near its right edge that allows the user to delete the row.

The blob may support a means to select a range of rows, and when selected, a way to delete the selected range of rows, or to permanently consolidate them to a single session.

Other embodiments may use a rectangle for each absolute note within each row of blob 1420, use multiple gradient stops for each absolute note, or use some other color scheme. Also blob 1420 and the piano keyboard may be drawn in any orientation (e.g. such that the piano keyboard extends vertically or is at the bottom).

The bubble 1430 that is displayed over the piano keyboard is the same as the bubble 1310 presented in FIG. 13. The user may move/resize bubble 1430 using the same techniques described in FIG. 13's description. The user may also double tap the bubble 1430 to make it match his/her most recent performance. When automatic updating of the user's selected vocal range is enabled (default unless disabled by the user), the musical training tool updates the size and position of bubble 1430 based on the user's most recent performance(s) without requiring a double-tap (see the description of FIG. 5 for more information about expansion/reduction of the user's selected vocal range). Some embodiments may consolidate the results from multiple sessions (in a temporary location not displayed to the user) before deciding on the exact size and position of the bubble 1430. The size and location of bubble 1430, combined with the various parameters defined by a lesson, determines what absolute keys should be performed within the lesson.

The blob 1420 (and the piano keyboard) may be used not only for the overall performance history of the user, but also for his/her performance for specific lessons and/or programs (for example by placing it below the section titled "History" in FIG. 20). The reason this can be useful is because the user's performance can be different based on what is involved in a lesson or a program.

FIG. 15

Figure 15:
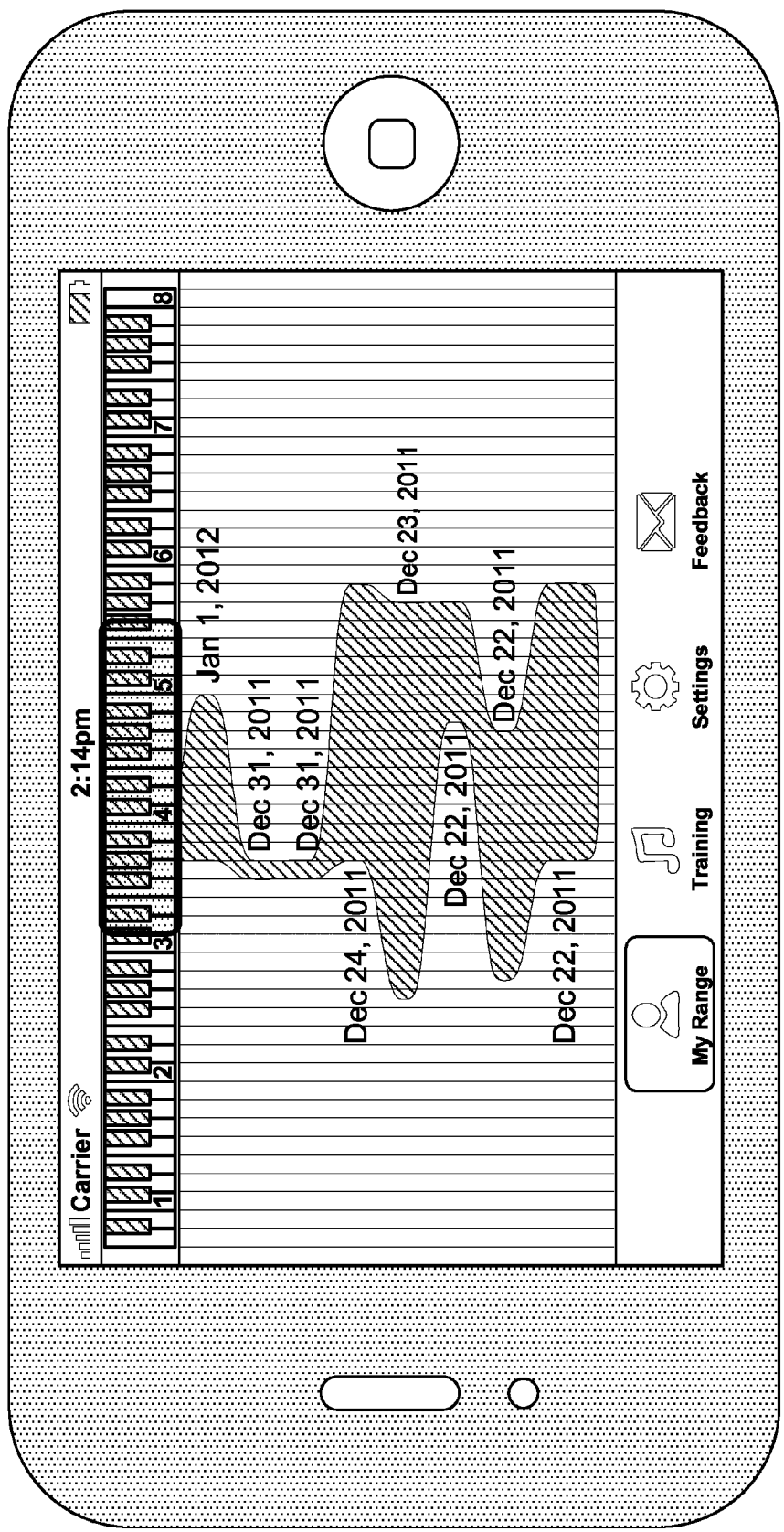
FIG. 15 shows the vocal range history screen of a smartphone embodiment of the musical training tool, captured in landscape orientation.

The display image of FIG. 15 is similar to that of FIG. 14, except in landscape orientation (and was also rendered after more sessions were practiced, hence the height of each session row is smaller). In this case the full width of a full-size piano keyboard (88 keys) fits on the screen. At this point it should be noted that the portion of the piano keyboard that is displayed in FIG. 14 is the portion that represents the notes that humans can reach vocally. If a different instrument (other than human voice) is targeted, then the piano display may be slid sideways (or zoomed in/out) to cover the range of notes that the instrument can generate.

FIG. 16

The musical training tool has built-in support for harmony lessons as well. Harmony lessons are designed such that a single user can perform them on his or her own. Harmony lessons may be used for vocal training, ear training, and/or instrument playing skills. A typical single-user harmony lesson involves the following steps:

a) The user performs the first harmony part across all absolute keys b) The user performs the second harmony part across all absolute keys c) The user performs the third harmony part across all absolute keys d) . . . and so on When a harmony part is being performed by the user, the musical training tool (depending on lesson definition and user settings) does one or more of the following for each harmony part:

Nothing.

Plays the part using a synthesized instrument (such as piano sounds).

Plays an audio recording of the user for the part (available only if the user has already performed the part earlier, either in this session or in a previous one).

Plays harmony-part-specific background audio that is provided by the lesson designer (this is similar to the earlier discussion about background audio, except a separate set of audio segments are provided for each harmony part by the lesson designer).

Figure 16:
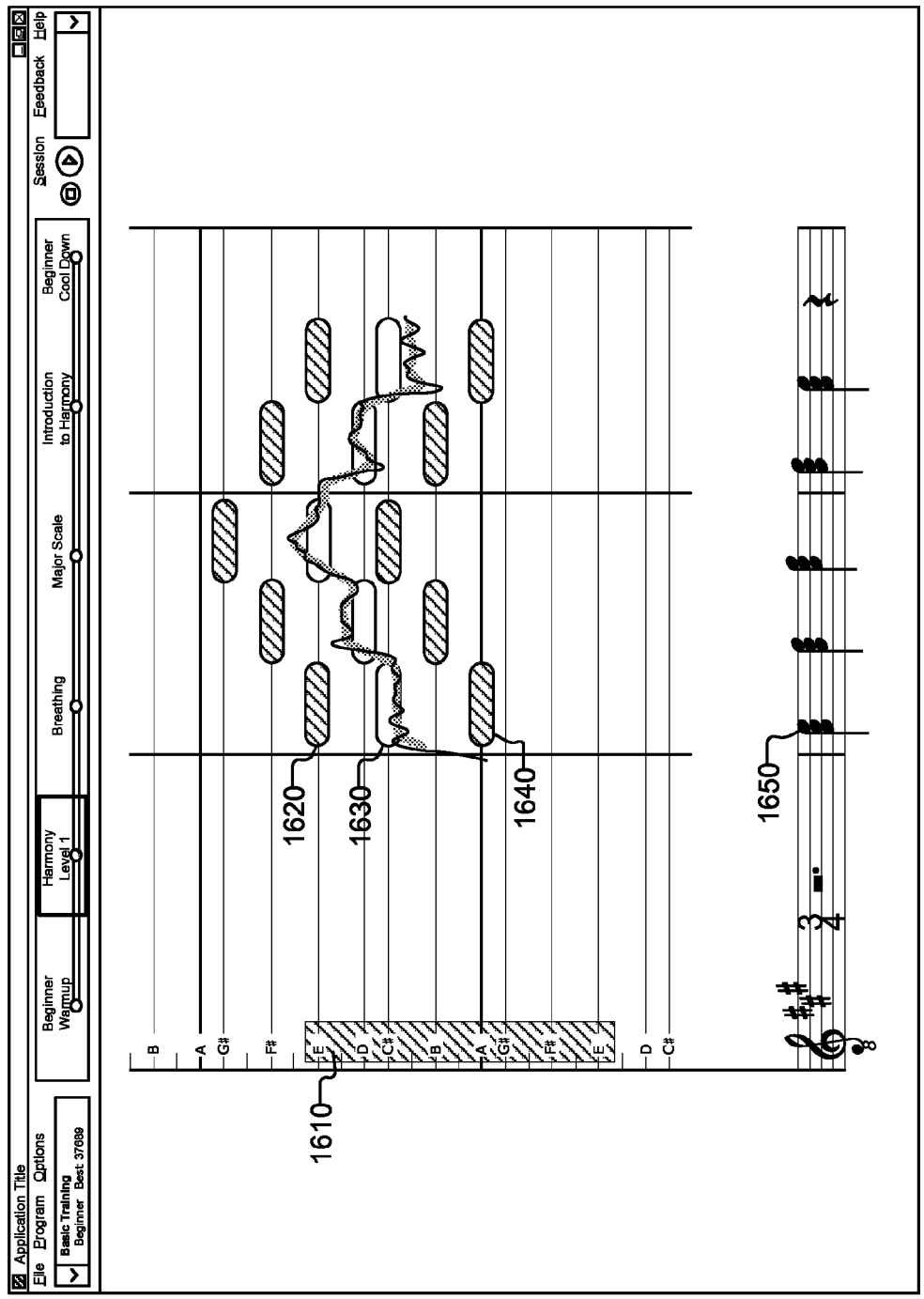
FIG. 16 depicts the display of a personal computer embodiment of the musical training tool during a lesson that teaches harmony singing.

In addition, the musical training tool plays (synthesizes) the notes that appear on other staffs/tracks that may or may not be visible on the screen, as long as synthesis is enabled for those tracks within the lesson's definition. (For example, the screen capture in FIG. 16 was from a lesson that had a backing track similar to that of the standard staff 502 of FIG. 5, however the lesson designer chose to hide that staff to save screen space and to provide the user with a less cluttered screen).

The musical training tool may also play any non-harmony-part-specific background audio, as in the case of normal lessons.

On platforms that support multiple microphones, each part may be performed by a different user simultaneously (with a separate instantaneous pitch line and/or a perceived pitch line assigned to each user, where each instantaneous/and or perceived pitch line may be drawn in a different color/style to help identify the microphone it is tracking). Multiple users may also use the tool in single-user mode by taking turns.

An alternative embodiment may support peer-to-peer communication among multiple musical training tools, so that multiple users can practice harmonies together, each using his/her own device. Users in this case can be collocated or be spread across the Internet. There is plenty of prior art in this area in the fields of voice telephony and networked multi-player game technology (although not ideal, a client-server based architecture can also be used if desired). Regardless of the networking technology used, each user can see the harmony part he/she is performing highlighted, while he/she hears the audio of the other users in real-time (with a separate volume control for each remote user's audio; if some of the users are collocated, they can turn off the audio from each other). The musical training tool may draw the instantaneous and perceived pitch lines for the local user only, or for all users (preferably selectable via a user-selectable setting).

The accuracy of each relative note instance is displayed at the end of the lesson, as with normal lessons.

The absolute note accuracy color overlay 1610 displays the accuracy for the harmony part that the user is currently performing. When all harmony parts are completed, it may be switched to display the overall accuracy for each absolute note (i.e. the average accuracy for the absolute note across all harmony parts).

Note bubbles 1620 for harmony parts that the user is not performing may be displayed in a different color, shape, or (as seen in the figure) with higher transparency. In addition (or alternatively), the note bubbles 1620, 1630, 1640 for each harmony part may be displayed in a different color, shape, etc. to make the identification of the harmony parts easier. This also applies to the display of the note heads 1650 in the standard staffs; i.e. if desired, note heads that correspond to different harmony parts may be drawn using different colors/transparencies depending on what harmony part they belong to and/or whether the user is currently performing the harmony part that the note heads belong to.

Instantaneous and perceived pitch lines are drawn live for the harmony part 1630 that the user is performing. If desired, instantaneous and/or perceived pitch lines may also be shown (preferably at once for each absolute key) for any previous harmony part that the user has already performed (which may be desirable especially if an audio recording of the user's performance for the corresponding harmony part is being played back).

FIG. 17

Figure 17:
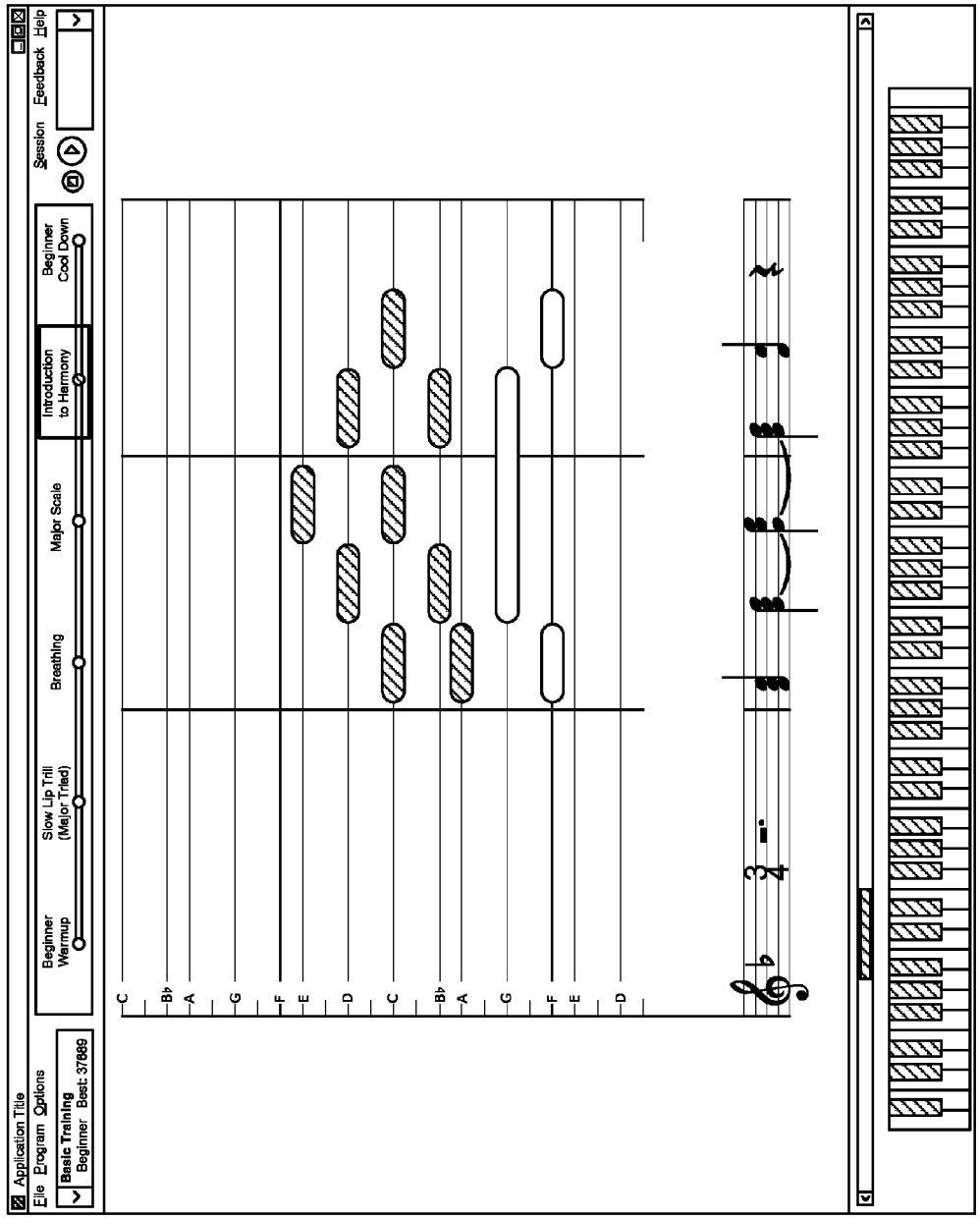
FIG. 17 depicts the display of a personal computer embodiment of the musical training tool, demonstrating different note durations for different harmony parts.

FIG. 17 demonstrates that each harmony part may have notes of different durations, and some harmony parts may include silences (rests) when others do not. When displaying standard staffs, the musical training tool automatically combines the different harmony parts into chords as needed, and displays them following the conventional norms for standard staff notation. However, this (automatic layout) is not mandatory, and an alternative embodiment may instead require the lesson designer to enter complete note layout information and hence avoid the work needed to do automatic note layout.

FIG. 18

Figure 18:
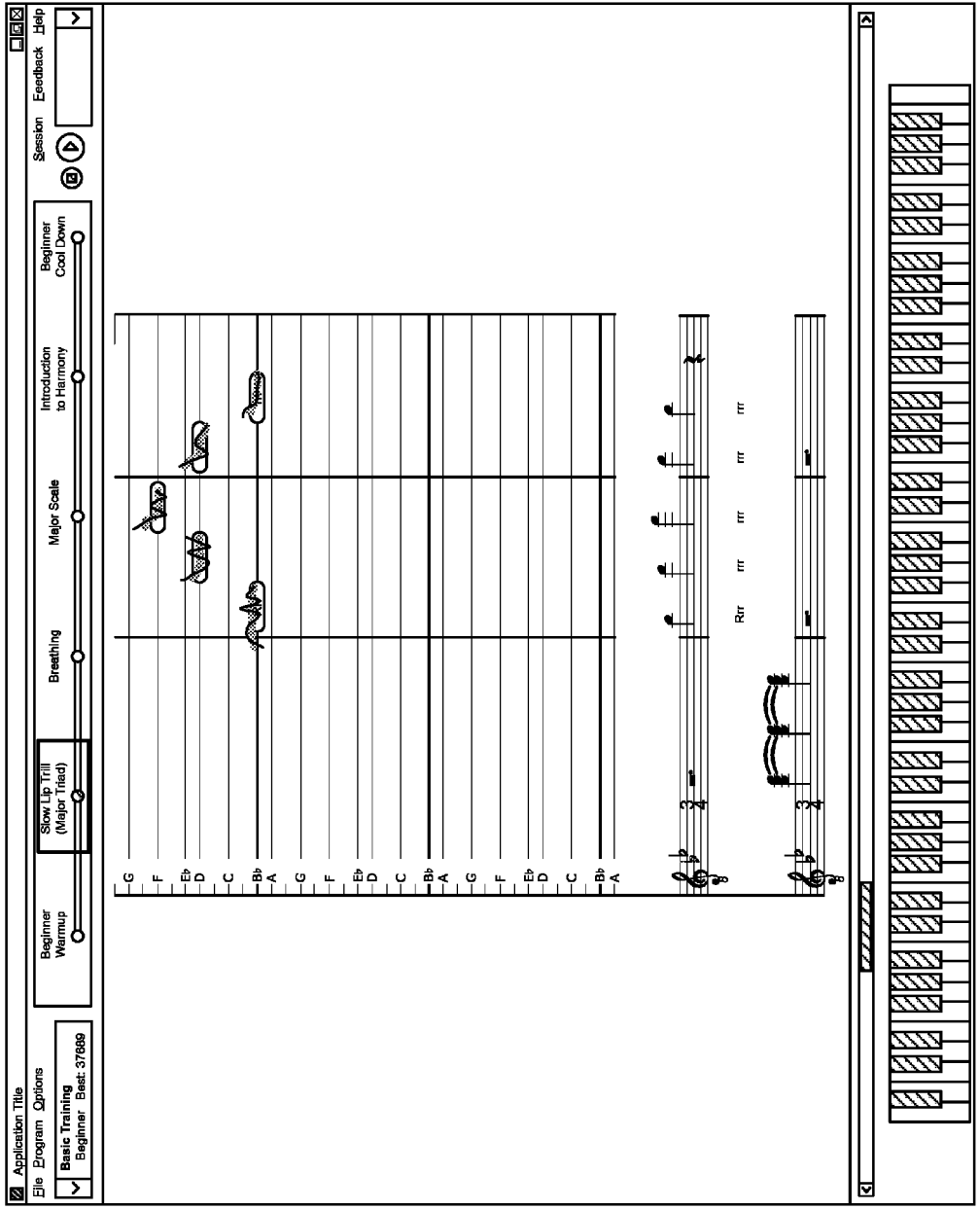
FIG. 18 depicts a display demonstrating broken pitch lines from a personal computer embodiment of the musical training tool.

FIG. 18 shows a lesson where the notes were not sung legato by the user. (A "gug" sound was used for each note as this lesson was performed). This demonstrates how the instantaneous pitch line and the perceived pitch line may both have breaks in them. The reader should note that throughout this specification, the term instantaneous pitch line (in the singular) is used to refer to the entire collection of line segments that correspond to instantaneous pitch, and the term perceived pitch line (in the singular) refers to the entire collection of line segments that correspond to perceived pitch.

FIG. 19

Figure 19:
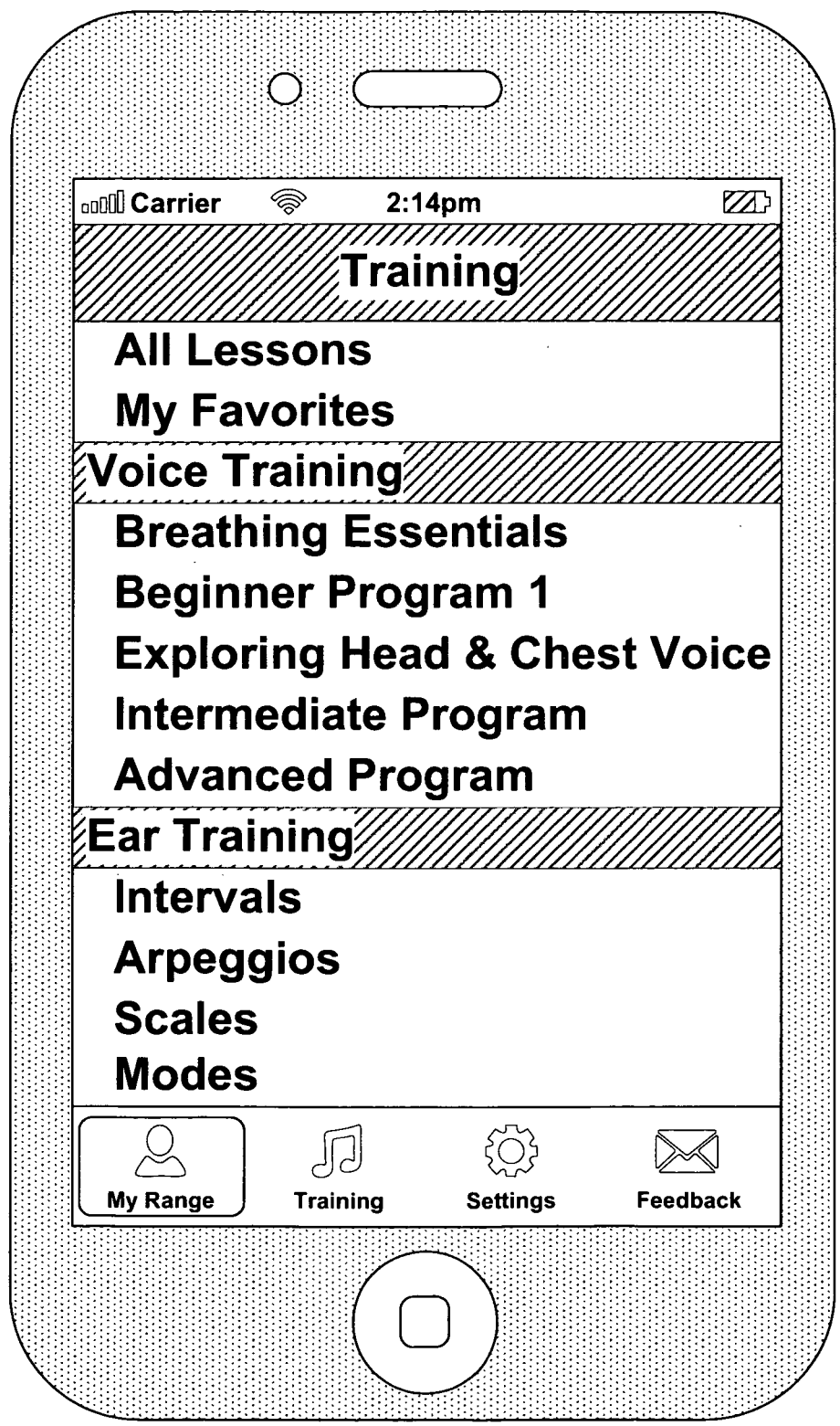
FIG. 19 shows the training program selection page from a smartphone embodiment of the musical training tool.

FIG. 19 shows the training program selection tab from a smartphone embodiment (such as an iPhone) of the musical training tool. The user uses this screen to select a training program. Alternatively, the user can tap on "All Lessons" to view a list of all the lessons, or "My Favorites" to view a list of the lessons he/she has marked as a favorite.

FIG. 20

FIG. 20 shows a training program named "Beginner Program 1". This page is displayed when the user taps on the training program named "Beginner Program 1" on the list shown in FIG. 19. The user can tap on a lesson name to view that lesson, or scroll down to see a history of his/her past performances for the currently viewed program.

FIG. 21

FIG. 21 shows the "All Lessons" list from a smartphone embodiment of the musical training tool. This page is displayed when the user taps on the item "All Lessons" in FIG. 19.

FIG. 22

FIG. 22 shows the lesson information page where the user gets information on the current lesson and can hear audio examples of experienced male and female singers performing the lesson. This page is displayed when the user taps on the information button 1118 in FIG. 11.

FIG. 23

Figure 23:
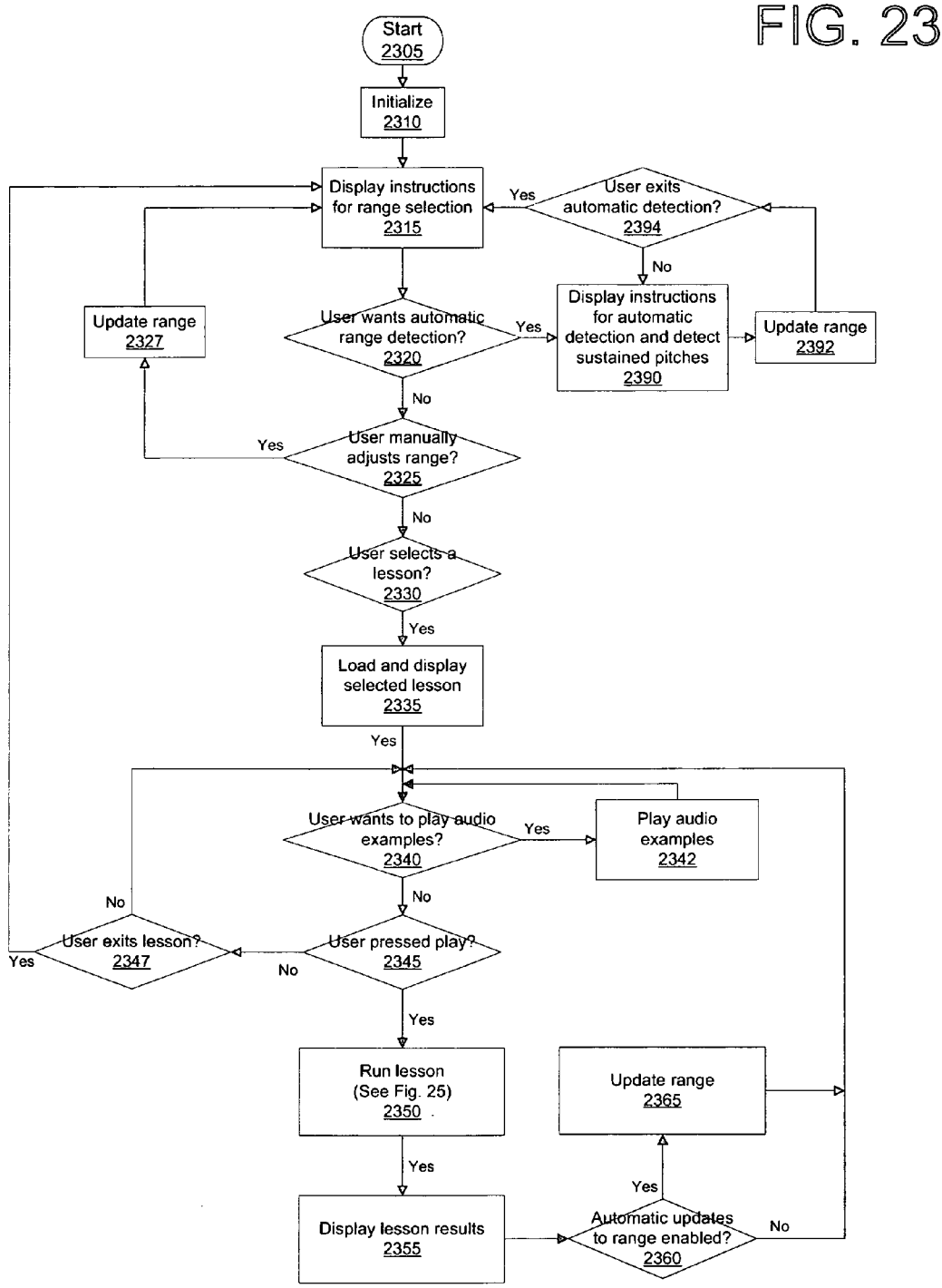
FIG. 23 shows the operations for one embodiment of the musical training tool, in this case for voice lessons.

FIG. 23 shows the operations for one embodiment of the musical training tool, in this case for voice lessons. The operations here are extracted from other sections of this document and represent only one embodiment out of various different possible embodiments. For more details on each operation, please see other sections of this document.

In this embodiment, when the user starts 2305 the tool, the tool first initializes 2310 itself. This step involves initializing all the variables, resources, etc. as needed by the rest of the steps. After initialization, the tool displays instructions for vocal range selection, such as those shown in FIG. 13. The user may adjust their range manually at this point, or use automatic range detection. If they use automatic detection, the tool displays 2390 instructions for automatic vocal range detection and keeps updating the selected vocal range as sustained notes are detected. When the user is happy with the results, he/she can stop the automatic detection mode. A mixture of automatic and/or manual selection steps can continue until the user selects 2330 a lesson from an available set of voice or ear training lessons. This allows the user, for example, to manually tweak the results of an automatic range detection result.

Figure 24:
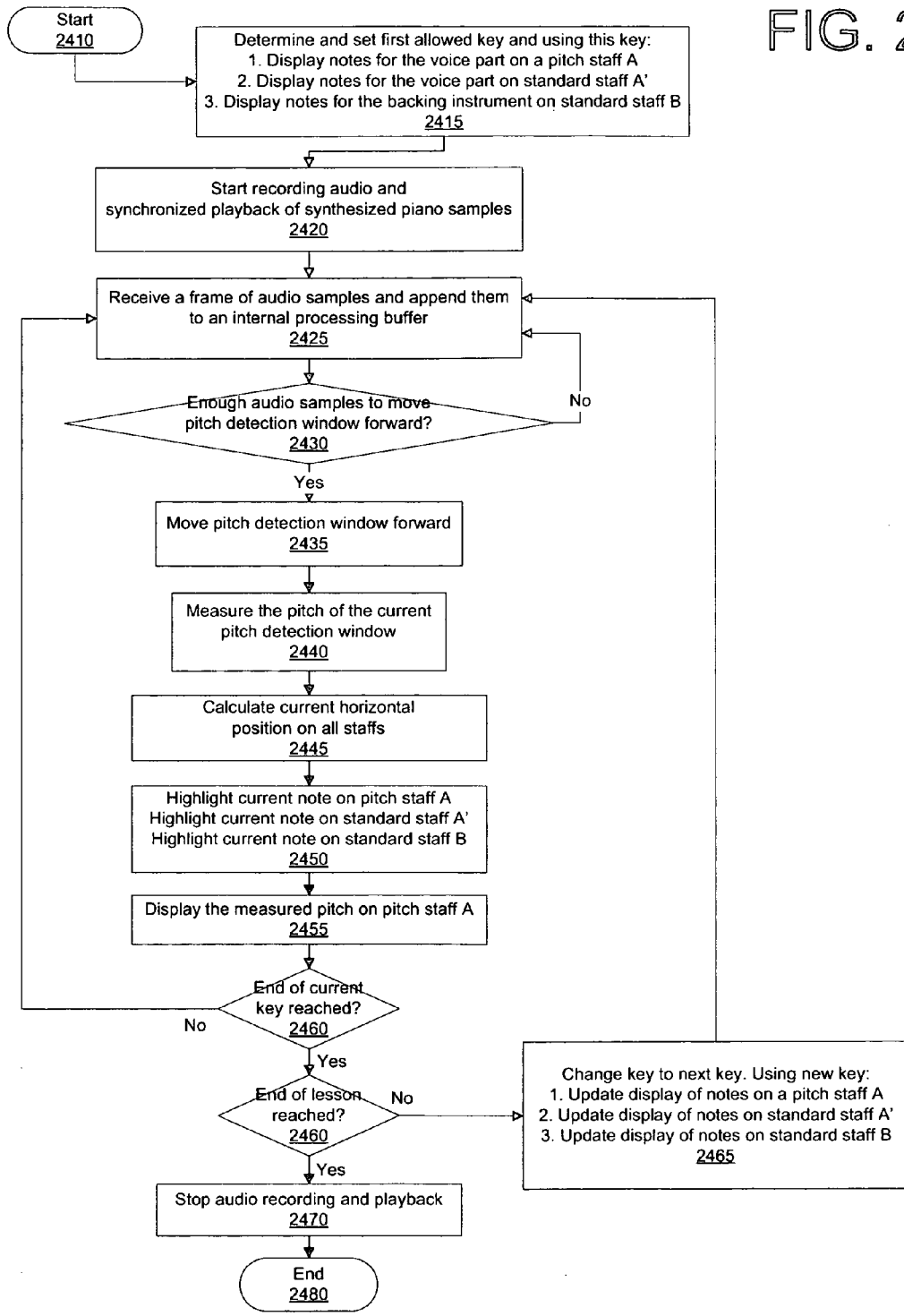
FIG. 24 shows a subset of operations for one embodiment of the musical training tool, in this case for voice lessons.

The tool then loads 2335 the selected lesson into memory and displays it on screen. If the lesson involves standard and/or pitch staffs, as depicted in the operations of FIG. 24, and the particular lesson is designed to display the staffs even before it is run, then an arbitrary key can be selected to display the notes on the staffs. One choice for this key selection is to pick an allowed key in the middle of the user's vocal range. An embodiment can use more complex algorithms as well, such as picking a key that doesn't have a signature in the standard staffs (e.g. a C-Major or A-Minor), and keeping the center of the entire range of notes within the lesson close to the center of the user's vocal range.

After the lesson is loaded and displayed 2335, the user is given an option to play 2340 any included audio examples until he/she is ready to start. Once the user is ready, he/she presses 2345 a play button to start the lesson. Otherwise he/she can repeat listening to the audio examples (i.e. playing 2342 them), or chose to exit 2347 the lesson.

When the user presses 2345 play, the tool starts running 2350 the lesson. The procedures for this are shown in FIG. 24.

When the lesson ends, the tool displays 2345 the results of the lesson on screen, and updates the user's vocal range based on the user's performance during the lesson, if automatic range updates are enabled. After this, the tool gives the user an option to listen to the audio examples again, run the lesson again, or exit the lesson.

FIG. 24

FIG. 24 shows a subset of operations for one embodiment of the musical training tool, in this case for voice lessons. The operations here are extracted from other sections of this document and represent only one embodiment out of various different possible embodiments. For more details on each operation, please see other sections of this document.

FIG. 24 represents the contents of the "Run Lesson" operation 2350 in FIG. 23. In other words, the contents of FIG. 24, in their entirety, can be used to replace box 2350 in FIG. 23.

In this embodiment, when a lesson is run 2410, the musical training tool first sets the musical key to the first allowed key according to rules discussed in other parts of this document, and displays 2415 the notes using this musical key. The notes are displayed on three staffs in this case, one standard staff (standard staff B) for a backing instrument such as a piano, another standard staff (standard staff A') for the notes that the user is asked to sing, and a pitch staff (pitch staff A) for the same notes that are displayed on standard staff A' (i.e. the notes that the user is asked to sing).

The tool then follows by starting 2420 recording audio and playing piano samples and other backing tracks in synchronization with the recording. As each frame of audio is received 2425, it is appended to a signal processing buffer. Whenever there is enough data to move the signal processing window for pitch detection forward (which depends on a window step size that may be different than the audio frame size, where audio frame size is a number that depends on audio hardware), the window is moved forward 2435 in time and a new pitch estimate is calculated 2440 using the audio samples within the window's new location. Note that there's plenty of prior art for moving windows for signal/audio processing, and various different techniques can be used to retrieve the audio samples and process them for pitch detection purposes.

Once a new pitch estimate is calculated 2440, the tool displays 2455 this pitch on pitch staff A. Other embodiments may also display the pitch on standard staff A' at this point. Before or after this operation, the note that is currently playing is also highlighted 2450 on screen, unless it is already highlighted.

When the end of a musical key is reached, the tool checks if there are more keys that need to be played. If there are, then the tool proceeds by changing 2465 the key to the next allowed key, updates 2465 the display of notes on all staffs, and continues receiving 2425 audio frames.

If the end of a lesson is reached, the tool stops 2470 audio recording and playback, and ends 2480 the running of the lesson.

Additional Notes

Average accuracy values that are used in various parts of the musical training tool are stored as sumOfAccuracyValuesCollected and numberOfAccuracyValuesCollected pairs, so that new accuracy values can be added to the accuracy values in a fair way whenever needed, without—for example—skewing the results towards newer values unless so desired.

Some embodiments of the musical training tool may allow the user to submit the audio of any of his/her vocal performances to a teacher electronically (using any form of electronic communication, e.g. email, direct access to a server, cloud storage, etc.) and allow the teacher to provide feedback either for free or for a fee. The user's identity may be kept confidential if desired. The user may also share his performance publicly (e.g. on a service like SoundCloud); the musical training tool may facilitate both the posting of audio to such servers and the relay of any feedback received back to the user (e.g. using SoundCloud APIs). Various existing technologies enable implementation of such features.

The musical training tool may allow the user to post the results of his/her performances (e.g. blob 1420 of FIG. 14) on public servers (such as Facebook for sharing with his/her friends). This is intended not only as a way to improve the user's enjoyment of the musical training tool and his/her motivation levels, but also as a way to promote the musical training tool itself for marketing purposes.

Instantaneous and/or perceived pitch feedback may also be presented on a standard staff, via a moving note head that shows the detected note. The downside of such visualization is that sometimes accidentals are required. Regardless, an embodiment may decide to use pitch feedback on standard staffs as well, either as a moving note head, or as line similar to the pitch staff pitch lines. Accidentals may be represented by offsetting the vertical position of the note head and/or pitch line (e.g. by a quarter of the distance between two staff lines for a perfectly hit accidental) and the key signature would determine the exact pitch of each staff (and ledger) line.

Instantaneous and perceived pitch lines may be disabled during some lessons (either by the user or by the lesson itself) in order to promote better listening skills. Instantaneous and perceived pitch lines may be displayed after the lesson (or a subsection of the lesson) is completed, so that the user can see how well he/she performed. Some lessons may also hide other elements (e.g. any or all of the staffs) temporarily in order to promote complete listening skills without any visual aid, or just show standard staffs to help further develop the user's sight singing skills (e.g. by also disabling the synthesis of piano sounds). Some lessons may also ask the user what notes/chords/scales/rhythm he/she has heard, for additional ear training purposes.

A lesson's definition may specify the clef for each standard staff statically, or it may ask the musical training tool to pick the most suitable clef given the user's selected vocal range. Some smartphone and WPF-based embodiments of the musical training tool use the Bass clef (F-Clef), the Vocal Tenor clef (G-Clef one octave lowered), and the Treble clef (G-Clef) when they automatically pick a clef, however other clefs may be used as well (e.g. the Baritone clef visualized using a C-Clef). Various algorithms can be used to pick the most suitable clef. One algorithm that works well is to compare the midpoint of the user's vocal range to the midpoint between the center of clef A and the center of clef B for each pair of musically adjacent clefs A and B (e.g. where {A, B} are {BassClef, VocalTenorClef} and {VocalTenorClef, TrebleClef}). Here, the center of a clef is defined as the absolute note that sits at the vertical center between the highest staff line (without using ledger lines) and the lowest staff line (without using ledger lines) of the clef. However, other embodiments may use different algorithms to the same/similar effect.

In addition (or as a replacement) to instantaneous and perceived pitch lines, some embodiments of the musical training tool may provide other visual and/or aural feedback to the user, to indicate the user's pitch accuracy and/or other measured properties of his/her performance. For example, an unpleasant sound may be played when the user is off the target note (potentially a different sound depending on whether the user's pitch is higher than the target note's pitch or lower than the target note's pitch), or the user's voice may be played back to him/her live at low volume to make his voice sound louder when he/she is hitting the notes accurately (e.g. the higher the accuracy, the louder the playback). Or, for example, text may be displayed on the screen (or announced through the speakers) to tell the user not to get louder when the musical training tool detects that the user's performance is getting louder, e.g. as he/she reaches for higher notes. There are many other parameters that may be measured from a user's performance, such as overshoot/undershoot when approaching notes, volume increase/decrease, breathiness, timbre, resonance, grit/rasp, vocal fry, presence/absence of singer's formants (spectral peaks around 3000 Hz, usually between 2800 Hz and 3400 Hz, that are absent in speech or in the spectra of untrained singers), etc. Those who are skilled in speech signal processing can easily come up with various algorithms to measure such parameters, even if crudely.

The musical training tool may also provide the user with static information (not as feedback based on the user's performance, but as generic comments, such as reminders to drink water, etc.). These reminders are built into lessons, and displayed at specified points in time during a lesson and removed at specified points in time. One good way to define a "point in time" for this purpose is to specify it as a percentage of the whole lesson duration. However, "a point in time" can also be defined in many different ways, such as a relative time from the beginning of a lesson, a relative time from the end of a lesson, specific key change, random, etc.

Performance data, user settings, favorites lists, purchased content, recorded audio, and other data stored and/or accessed by the musical training tool may be shared among multiple instances of one or more embodiments of it owned/used by a single user. This is so that the user can continue practicing on different devices (e.g. on an iPhone on the road, on an iPad when on vacation, on a PC when at home) and alternate between them freely without having to worry about transferring performance data manually or dealing with different copies of his past performance, settings, etc. Such sharing of information is ideally done automatically and there's plenty of prior art with various techniques to achieve it, with cloud storage being a popular approach in recent years. For example, if cloud storage is used, any updates to data may be uploaded to a server at predetermined points (e.g. at the end of a lesson or at the end of a session) and the data on the server maybe be queried for changes at predetermined points (e.g. at the beginning of a session), at which point any updates to the data may be downloaded. Instead of polled queries, push services may also be used to push changes on one device (or on the cloud) to all other devices.

If desired, the user's selected range can be marked/displayed on a pitch staff (e.g. pitch staff 300 in FIG. 3). This can be done in various ways, such as by drawing a rectangle (e.g. with or without rounded corners) that marks the user's selected vocal range. Such a rectangle may extend the full width of the pitch staff 300, or may be placed over or next to the note names 301 in FIG. 3. The rectangle may or may not have a visible border, a transparent background color, etc. Alternatively, for example, instead of a rectangle a brace may be placed to the left or to the right of the pitch staff to mark the user's selected vocal range. An advantage of marking the user's selected vocal range (regardless of how it is marked) would be to give the user a way of knowing when the notes are getting close to the extremities of his/her vocal range as the lesson's absolute key keeps changing.

A single pitch staff may support multiple instantaneous and/or perceived pitch lines if either multiple microphones are available, or pitch detection for multiple simultaneous sound sources is supported.

As a final note, different embodiments of the musical training tool may omit any number of the features that are described in this document for simplicity or for any other reason. Many of the elements that are described can also be useful in their own right in/with various other technologies in various fields. For example, the pitch staff notation can be useful even on real paper (and is hence designed to be compatible with that medium as well). Any combination/subset of the elements and/or features that are described within this document are considered to be different embodiments of the musical training tool, even if the name "musical training tool" doesn't apply in those contexts While the foregoing is directed to embodiments of the present invention, other and further embodiments of the invention may be devised without departing from the basic scope thereof, and the scope thereof is determined by the claims that follow.

I claim:

1. A method for providing automated musical training, comprising:
   presenting via a display, by a processor, a pattern of music notes using a pitch-based representation;
   playing, by the processor, said pattern of music notes in one or more absolute keys, where absolute key is defined by key, octave and scale;
   presenting via said display, by the processor, absolute key changes in-place, as changes to the vertical locations of the visual representation of said music notes on said pitch-based representation, where the motions of said visual representations are relative to said pitch-based representation, which is vertically scrollable;
   receiving, by the processor, an audio response;

estimating, by the processor, pitches of sounds within said audio response; and displaying via said display, by the processor, the estimated pitches within said pitch-based representation, whereby, a user can visually see how pitches of notes change as keys change by letting the notes move vertically without scrolling the pitch-based representation, or how scales relate to each other either by scrolling the pitch-based representation vertically, which can be done manually or automatically, as absolute keys change or by performing an exercise that keeps the key constant during a subset of scale changes, so that the notes that change from scale to scale move vertically relative to a key that remains fixed relative to the display without the need to scroll the pitch-based representation.

2. The method of claim 1, further comprising:

presenting via the display, by the processor, said pattern of music notes in a conventional staff notation;

aligning by the processor, the horizontal axis of said pitch-based representation with the horizontal axis of said conventional staff notation, whereby the user can see how pitches of notes relate to notes in the conventional staff notation, especially as keys and or scales change, to help with learning to read music and improving sight-singing.

3. The method of claim 2, further comprising:

using, by the processor, a semi-linear time scale when aligning the horizontal axis of said pitch-based representation with the horizontal axis of said conventional staff notation, wherein said semi-linear time scale comprises a linearly increasing time except for gaps introduced by music notation bar lines.

4. The method of claim 2, further comprising:

using, by the processor, a non-linear time scale when aligning the horizontal axis of said pitch-based representation with the horizontal axis of said conventional staff notation using a non-linear time scale for the horizontal axes of said pitch-based representation and said conventional staff notation, where said non-linear time scale follows the timing rules of said conventional staff notation, whereby the entire said pattern of music notes can be fit on said display device without the need for horizontal scrolling or losing legibility (by zooming out beyond an acceptable level), even on small display devices.

5. The method of claim 1, further comprising:

calculating, by the processor, the maximal vocal range detected during each session of a specific user, across one or more exercises performed during said session;

storing, by the processor, said maximal vocal range for a plurality of said sessions; and presenting via a display, by the processor, historical changes in said maximal vocal range of said specific user, whereby the user can see how his/her vocal range is expanding with practice, and get motivated to practice more.

6. The method of claim 1, further comprising:

calculating, by the processor, an accuracy of pitch for each music note pre-identified as a target note within said pattern of music notes;

averaging, by the processor, said accuracies of pitch for all repetitions of said absolute note within a session;

storing, by the processor, the average accuracy of pitch for each said absolute note, for a plurality of said sessions; and presenting via a display, by the processor, historical changes in said average accuracy of pitch, across sessions, for each said absolute note attempted by a specific user, whereby the user can see areas to focus on in his/her vocal range, such as breaks between vocal registers or other weak areas, where he/she consistently has problems.

7. The method of claim 1, further comprising:

generating, by the processor, comparison results that compare estimated pitches of sounds within said audio response, to pitches of a subset of said plurality of music notes; and presenting, by the processor, the comparison results via aural feedback, whereby a visually impaired person can benefit from said musical training, or a person who cannot look at a visual display at certain times, such as when driving a car, can continue to benefit from said musical training.

8. The method of claim 1, further comprising:

estimating, by the processor, quality of vocal tone present within said audio response; and displaying via said display, by the processor, said quality of vocal tone, whereby a user can focus on improving his/her vocal tone.

9. The method of claim 1, wherein said music notes comprise a portion from one of i) a voice lesson, ii) an ear training lesson, iii) a musical instrument lesson, iv) a violin lesson, v) a brass instrument lesson, vi) a harmony training lesson, or vii) a section of a song.

10. The method of claim 1, further comprising automatically determining a set of said absolute keys to use for an exercise, in accordance with the vocal range (or skill level if practicing an instrument) of the user that will be performing said exercise.

11. The method of claim 1, further comprising:

calculating, by the processor, an average accuracy of pitch for each music note pre-identified as a target note within said pattern of music notes; and presenting via the display, by the processor, said average accuracy of pitch for each said note, during and/or at the end of a performance, whereby a user can see how well he/she performs each note based on its relative position in said pattern, i.e. relationship relative to other notes (e.g. how well he/she handles different ascending or descending intervals).

12. The method of claim 1, further comprising:

estimating, by the processor, amount of vibrato present within said audio response; and displaying via said display, by the processor, said amount of vibrato, whereby a user can focus on improving his/her vibrato, and hence breathing.

13. A non-transitory computer-readable medium having a set of instructions stored therein which, when executed by a processing device, causes said processing device to perform procedures comprising:

presenting via a display, by said processing device, a pattern of music notes using a pitch-based representation;

playing, by said processing device, said pattern of music notes in one or more absolute keys, where absolute key is defined by key, octave and scale;

presenting via said display, by said processing device, absolute key changes in-place, as changes to the vertical locations of the visual representation of said music notes on said pitch-based representation, where the motions of said visual representations are relative to said pitch-based representation, which is vertically scrollable;

receiving, by said processing device, an audio response;

estimating, by said processing device, pitches of sounds within said audio response; and displaying via said display, by said processing device, the estimated pitches within said pitch-based representation, whereby, a user can visually see how pitches of notes change as keys change by letting the notes move vertically without scrolling the pitch-based representation, or how scales relate to each other either by scrolling the pitch-based representation vertically, which can be done manually or automatically, as absolute keys change or by performing an exercise that keeps the key constant during a subset of scale changes, so that the notes that change from scale to scale move vertically relative to a key that remains fixed relative to the display without the need to scroll the pitch-based representation.

* * * * *